United States Patent
Passian et al.

(10) Patent No.: US 8,448,261 B2
(45) Date of Patent: May 21, 2013

(54) MODE SYNTHESIZING ATOMIC FORCE MICROSCOPY AND MODE-SYNTHESIZING SENSING

(75) Inventors: Ali Passian, Knoxville, TN (US); Thomas George Thundat, Knoxville, TN (US); Laurene Tetard, Knoxville, TN (US)

(73) Assignees: University of Tennessee Research Foundation, Knoxville, TN (US); UT-Battelle, LLC, Oak Ridge, TN (US)

( * ) Notice: Subject to any disclaimer, the term of this patent is extended or adjusted under 35 U.S.C. 154(b) by 283 days.

(21) Appl. No.: 12/726,083

(22) Filed: Mar. 17, 2010

(65) Prior Publication Data

US 2011/0231965 A1 Sep. 22, 2011

(51) Int. Cl.
*G01Q 60/24* (2010.01)
*G01Q 60/58* (2010.01)

(52) U.S. Cl.
USPC .............................................. 850/37; 850/50

(58) Field of Classification Search
USPC ................................. 850/36–38, 50
See application file for complete search history.

(56) References Cited

U.S. PATENT DOCUMENTS

| | | | |
|---|---|---|---|
| 4,255,971 A | 3/1981 | Rosencwaig | |
| 4,276,780 A | 7/1981 | Patel et al. | |
| 4,543,486 A | 9/1985 | Rose | |
| 4,678,905 A | 7/1987 | Phillips | |
| 4,897,541 A | 1/1990 | Phillips | |
| 4,931,384 A | 6/1990 | Layton et al. | |
| 5,036,708 A | 8/1991 | Urban et al. | |
| 5,060,248 A * | 10/1991 | Dumoulin | ........................ 378/53 |
| 5,118,608 A | 6/1992 | Layton et al. | |
| 5,141,331 A | 8/1992 | Oehler et al. | |
| 5,285,677 A | 2/1994 | Oehler | |
| 5,319,977 A | 6/1994 | Quate et al. | |
| 5,360,268 A | 11/1994 | Hayashi et al. | |
| 5,391,001 A | 2/1995 | Rupert et al. | |
| 5,440,388 A | 8/1995 | Erickson | |
| 5,485,277 A | 1/1996 | Foster | |
| 5,744,704 A * | 4/1998 | Hu et al. | .......................... 73/105 |
| 5,977,538 A | 11/1999 | Unger | |
| 6,006,593 A | 12/1999 | Yamanaka | |
| 6,050,722 A | 4/2000 | Thundat et al. | |

(Continued)

FOREIGN PATENT DOCUMENTS

| | | |
|---|---|---|
| DE | 39 25 312 A1 | 4/1990 |
| EP | 1 493 380 A1 | 1/2005 |
| JP | 11253794 A | 9/1999 |
| JP | 2001183294 A | 7/2001 |

OTHER PUBLICATIONS

U.S. Appl. No. 12/189,652, filed Aug. 11, 2008, Van Neste et al.
U.S. Appl. No. 12/189,663, filed Aug. 11, 2008, Van Neste et al.

(Continued)

*Primary Examiner* — Jack Berman
*Assistant Examiner* — Eliza Osenbaugh-Stewart
(74) *Attorney, Agent, or Firm* — Brinks Hofer Gilson & Lione

(57) ABSTRACT

A method of analyzing a sample that includes applying a first set of energies at a first set of frequencies to a sample and applying, simultaneously with the applying the first set of energies, a second set of energies at a second set of frequencies, wherein the first set of energies and the second set of energies form a multi-mode coupling. The method further includes detecting an effect of the multi-mode coupling.

27 Claims, 27 Drawing Sheets

U.S. PATENT DOCUMENTS

| | | | |
|---|---|---|---|
| 6,066,295 A | 5/2000 | Bernstein et al. | |
| 6,330,824 B1 | 12/2001 | Erie et al. | |
| 6,379,210 B2 | 4/2002 | Xu et al. | |
| 6,400,449 B2 | 6/2002 | Maris et al. | |
| 6,466,806 B1 | 10/2002 | Geva et al. | |
| 6,630,111 B1 | 10/2003 | Willson, III | |
| 6,639,184 B1 | 10/2003 | Ennis | |
| 6,657,196 B2 | 12/2003 | Endo et al. | |
| 6,683,300 B2 | 1/2004 | Doroshenko et al. | |
| 6,831,747 B2 | 12/2004 | Ferrell et al. | |
| 6,979,292 B2 | 12/2005 | Kanayama et al. | |
| 7,091,254 B2 | 8/2006 | Crivello | |
| 7,207,206 B2 | 4/2007 | Pinnaduwage et al. | |
| 7,243,548 B2 | 7/2007 | Thundat et al. | |
| 7,245,380 B2 | 7/2007 | Kosterev | |
| 7,326,580 B2 | 2/2008 | Fukushima et al. | |
| 7,411,189 B2 | 8/2008 | Kawakatsu | |
| 7,442,922 B2 | 10/2008 | Knebel et al. | |
| 7,448,269 B2 | 11/2008 | Shekhawat et al. | |
| 7,487,667 B2 * | 2/2009 | Matsumoto et al. | 73/105 |
| 7,605,922 B2 | 10/2009 | Willing | |
| 7,665,364 B2 | 2/2010 | Su et al. | |
| 7,679,063 B2 | 3/2010 | Hoffman et al. | |
| 7,691,583 B2 | 4/2010 | Craighead | |
| 7,838,869 B2 | 11/2010 | Perera et al. | |
| 7,924,423 B2 | 4/2011 | Van Neste et al. | |
| 7,958,565 B2 * | 6/2011 | Ando et al. | 850/33 |
| 7,961,313 B2 | 6/2011 | Van Neste et al. | |
| 8,080,796 B1 | 12/2011 | Van Neste et al. | |
| 8,194,246 B2 | 6/2012 | Thundat et al. | |
| 2002/0125433 A1 | 9/2002 | Endo et al. | |
| 2002/0135755 A1 | 9/2002 | Kley | |
| 2002/0166969 A1 | 11/2002 | Chou et al. | |
| 2003/0039429 A1 * | 2/2003 | Inoue et al. | 385/12 |
| 2003/0052268 A1 | 3/2003 | Doroshenko et al. | |
| 2004/0085540 A1 | 5/2004 | Lapotko et al. | |
| 2004/0113077 A1 | 6/2004 | Franzen et al. | |
| 2004/0120577 A1 | 6/2004 | Touzov | |
| 2005/0004458 A1 | 1/2005 | Kanayama et al. | |
| 2005/0070803 A1 | 3/2005 | Cullum et al. | |
| 2005/0117155 A1 | 6/2005 | Kosterev | |
| 2005/0201661 A1 | 9/2005 | Loock et al. | |
| 2005/0244747 A1 | 11/2005 | Nagai et al. | |
| 2007/0152154 A1 | 7/2007 | De Camp et al. | |
| 2007/0175760 A1 | 8/2007 | Thundat et al. | |
| 2007/0220978 A1 * | 9/2007 | Su et al. | 73/632 |
| 2007/0220979 A1 | 9/2007 | Su et al. | |
| 2008/0094614 A1 | 4/2008 | Tuschel et al. | |
| 2008/0191137 A1 | 8/2008 | Poteet et al. | |
| 2008/0276695 A1 | 11/2008 | Prater et al. | |
| 2009/0114024 A1 | 5/2009 | Shekhawat et al. | |
| 2009/0174884 A1 | 7/2009 | Kosterev et al. | |
| 2009/0268200 A1 | 10/2009 | Klug et al. | |
| 2009/0321647 A1 | 12/2009 | Shelley et al. | |
| 2010/0033720 A1 | 2/2010 | Van Neste et al. | |
| 2010/0033722 A1 | 2/2010 | Van Neste et al. | |
| 2010/0033723 A1 | 2/2010 | Thundat et al. | |
| 2010/0043107 A1 * | 2/2010 | Proksch | 850/40 |

OTHER PUBLICATIONS

U.S. Appl. No. 12/488,238, filed Aug. 11, 2008, Thundat et al.
U.S. Appl. No. 12/726,118, filed Mar. 17, 2010, Passian et al.
U.S. Appl. No. 12/828,064, filed Jun. 30, 2010, Van Neste et al.
XI International Scanning Probe Microscopy Conference 2009—Poster Session; (8 pages).
Tetard et al., *New modes for subsurface atomic force microscopy through nanomechanical coupling*; Nature Nanotechnology (Letters) (Dec. 20, 2009); www.nature.com/naturenanotechnology.
PCT Search Report and Written Opinion dated Dec. 14, 2009, PCT/US2009/052806, filed Aug. 5, 2009.
*Crossing the line: how aggressive cells invade the brain*; R&D Mag Nov. 6, 2009; pp. 1-3; www.rdmag.com/.
PCT Seach Report and Written Opinion dated Feb. 6, 2010, PCT/US2009/052820, filed May 8, 2009.
Van Neste et al., Standoff Detection of Explosive Residues Using Photothermal Microcantilevers, *Applied Physics Letters*, 92, 134102 (2008), © 2008 American Institute of Physics.
Van Neste et al., *Standoff photoacoustic spectroscopy*, Applied Physics Letters, 92; 2008; pp. 1-3.
Uotila et al., *Fourier Transform Infrared Measurement of Solid-, Liquid-, and Gas-Phase Samples with a Single Photoacoustic Cell*; Applied Spectroscopy; vol. 62, No. 6; 2008; pp. 655-659.
Tetard et al., *Elastic phase response of silica nanoparticles buried in soft matter*, Applied Physics Letters 93; 133113 (Published on-line Oct. 2, 2008); pp. 133113-1-133113-3.
*First helium microscope is put through paces at NIST*; R&D Mag (Sep. 3, 2008); pp. 1-2; www.rdmag.com/News/2008/09/First-helium--microscope-is-put-through-paces-at-NIST.
*WITec Microscope Technology Win Prestigious 2008 R&D 100*; Chemie.De (Jul. 10, 2008); www.chemie.ded/news/e/84528.
*WITec Microscope Technology Wins Prestigious 2008 R&D 100 Award*; WITec; Jul. 2008 www.witec.de/en/company/witecnews/news.php?id=37.
ORNL Demonstrates Super-Sensitive Explosives Detector, Oakridger.com, Jun. 30, 2008.
Tetard et al.,; *Imaging nanoparticles in cells by nanomechanical holography*; Nature Nanotechnology Letters (Jun. 22, 2008); pp. 501-505; www.nature.com/naturenanotechnology.
Uotila, J., *A new design of the differential photoacoustic gas detector combined with a cantilever microphone*, The European Physical Journal, Special Topics, vol. 153, Mar. 12, 2008, pp. 401-404.
Sievilia et al., *Fabrication and characterization of an ultrasensitive acousto-optical cantilever*, Journal of Micromechanics and Microengineering; 17; 2007; pp. 852-859.
Lindley et al., *sensitivity comparison of three photoacoustic cells containing a single microphone, a differential dual microphone or a cantilever pressure sensor*, Applied Physics B, Lasers and Optics; 86; 2007; pp. 707-713.
Koskinen et al., *Cantilever enhanced photoacoustic detection of carbon dioxide using a tunable diode laser source*, Applied Physics B, Lasers and Optics, vol. 86, No. 3, Jan. 23, 2007, pp. 451-454.
Koskinen et al., *Extremely sensitive trace gas analysis with modern photoacoustic spectroscopy*; Science Direct, Vibrational Spectroscopy; 42; 2006; pp. 239-242.
Waghe et al., Infrared Study of UV-Irradiated Tungsten Trioxide Powders Containing Adsorbed Dimethyl Methyl Phosphonate and Trimethyl phosphate, *Res. Chem Intermed*, vol. 32, No. 7, pp. 613-623, 2006.
Wouters et al., *Automated Scanning Probe Microscopy for Combinatorial Polymer Research*; Mater.Res.Soc.Symp.Proc.vol. 894 (2006), pp. 111-117.
Shekhawat et al., *Nanoscale Imaging of Buried Structures via Scanning Near-Field Ultrasound Holography*; Science Mag; vol. 310; Oct. 7, 2005; www.sciencemag.org; pp. 89-92.
Kosterev et al., *Applications of quartz tuning forks in spectroscopic gas sensing*, Review of Scientific Instruments, vol. 76, No. 4, Mar. 23, 2005, pp. 043105-1 043105-9.
Ledermann et al., *Piezoelectric Pb($Zr_x$, $Ti_{1-x}$)O3 thin film cantilever and bridge acoustic sensors for miniaturized photoacoustic gas detectors*; Journal of Micromechanics and Microengineering; 14; 2004; pp. 1650-1658.
Su et al., *Quartz tuning fork biosensor*, Biosensors and Bioelectronics, Elsevier, vol. 17, No. 1/02, Jan. 1, 2001, pp. 111-117.
Cuberes et al.; *Heterodyne force microscopy of PMMA/rubber nanocomposites: nanomapping of viscoelastic response at ultrasonic frequencies*; J. Phys.D: Appl. Phys. 33 (2000); pp. 2347-2355.
Wells, P. N.T., *A Vital Diagnostic Tool that Has Great Opportunities for Further Development*; IEEE Engineering in Medicine and Biology; Sep./Oct. 2000; pp. 14-20.
Crippa et al., C.; *Time-resolved photoacoustic spectroscopy: new developments of an old idea*; New Trends in Photobiology (Invited Review); 24; 1994; pp. 3015.
Kolosov et al., *Nonlinear Detection of Ultrasonic Vibrations in an Atomic Force Microscope*; Jpn. J. Appl. Phys. vol. 32 (1993); pp. L 1095-L 1098.
Yang et al., H.L., In Situ Diffuse Reflectance Infrared Spectroscopic Study of the Photodecomposition of Dibenzyl Ketone Adsorbed on Zeolites, *J. Phys. Chem*, 90, pp. 2422-2424, 1986.

Tetard et al., *New modes for subsurface atomic force microscopy through nanomechanical coupling*; Nature Nanotechnology (Supplementary Information); www.nature.com/naturenanotechnology; pp. 1-9, 20-28.
*AFM-Raman System*; Renishaw; pp. 1-3; http://www.renishaw.com/en/6638.aspx.
*MultiView 1000*; Nanonics Imaging Ltd.; pp. 1-7; http://www.nanonics.co.il/multiview-1000.html.
*MonoVista CRS*; Princeton Instruments; pp. 1-2; www.princetoninstruments.com/products/specsys/monovistacrs/.
*Alpha500 Automated Confocal Raman & Atomic Force Microscope*; WITec; www.witec.de.
*Alpha300A Atomic Force Microscope*; WITec; www.witec.de.
*Welcome to WITec*; WITec; www.witec-instruments.com/en/home/.
*Atomic Force Microscope alpha300 A*; WITec; www.witec-instruments.com/en/products/afm/alpha300a/.
*Confocal Raman and Atomic Force Microscope alpha 500*; WITec; www.witec-instruments.com/en/products/raman/alpha500/.
*Atomic force microscope*; Wikipedia, the free encyclopedia; pp. 1-7; http://en.wikipedia.org/wiki/Atomic_force_microscope.
*Lock-in Amplifier*, Wikipedia, the free encyclopedia; pp. 1-4 http://en.wikipedia.org/wiki/Lock-in_amplifier.
Google Search results for "mode synthesizing sensing atomic force microscopy", www.google.com/search?hl=en&ie=ISO-8859-1&q=mode+synthesizing+sensing+atomic+force+micro . . . ; (2 pages).
Gaft et al., "UV Gated Raman Spectroscopy for Standoff Detection of Explosives," Optical Materials, vol. 30, (2008), pp. 1739-1746.

\* cited by examiner

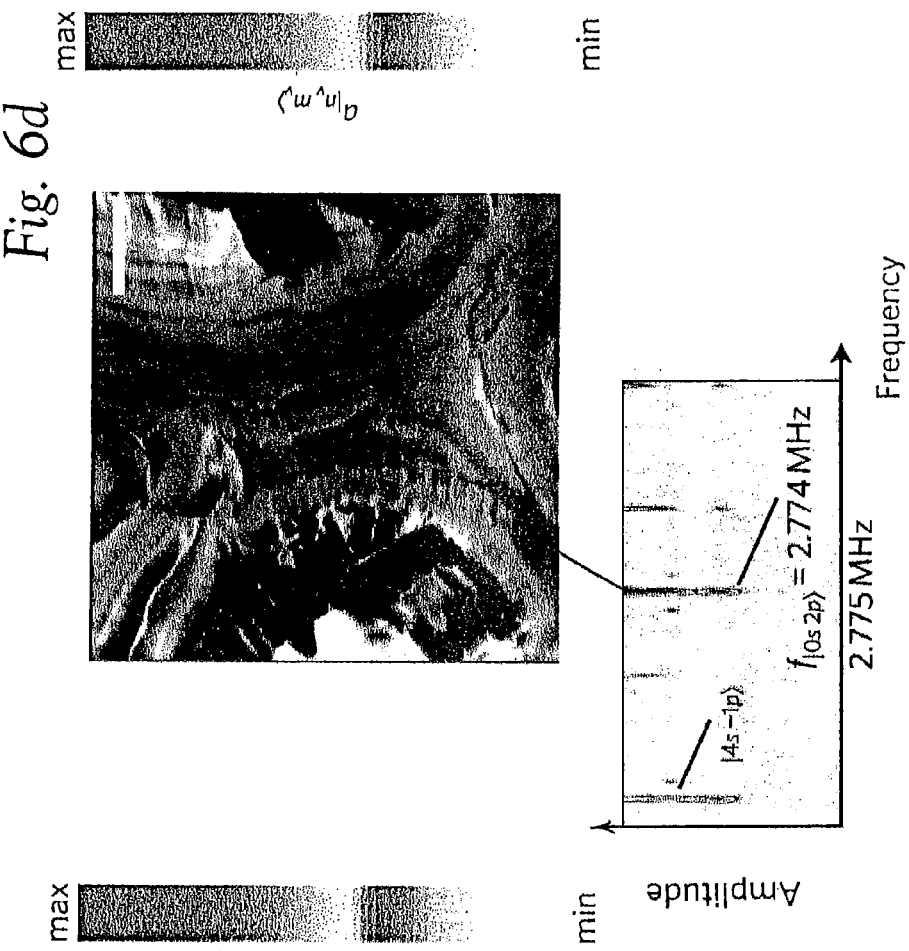
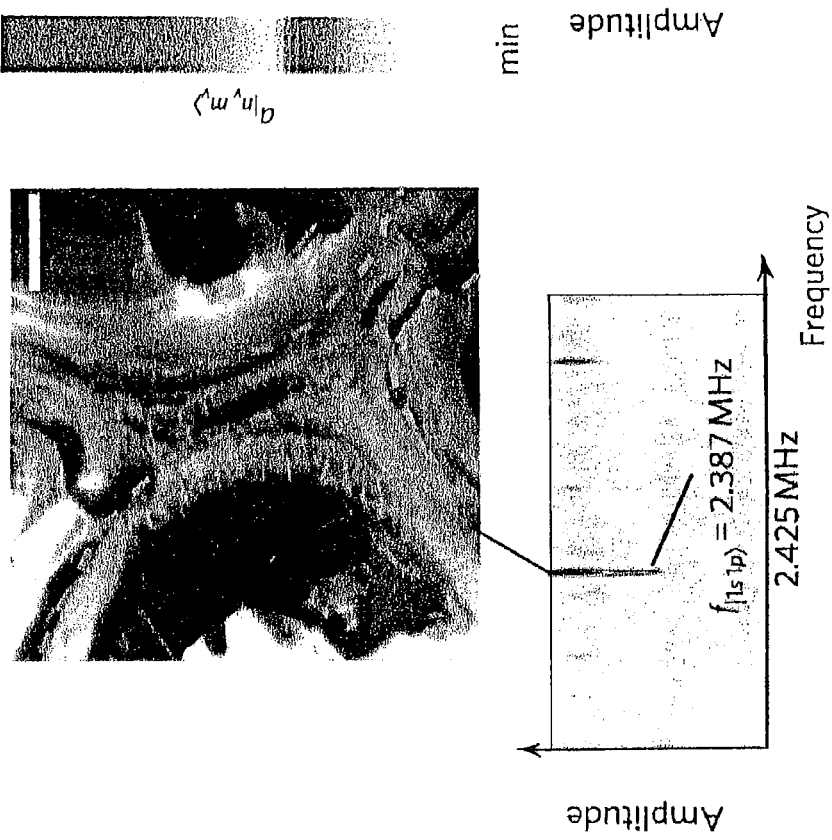

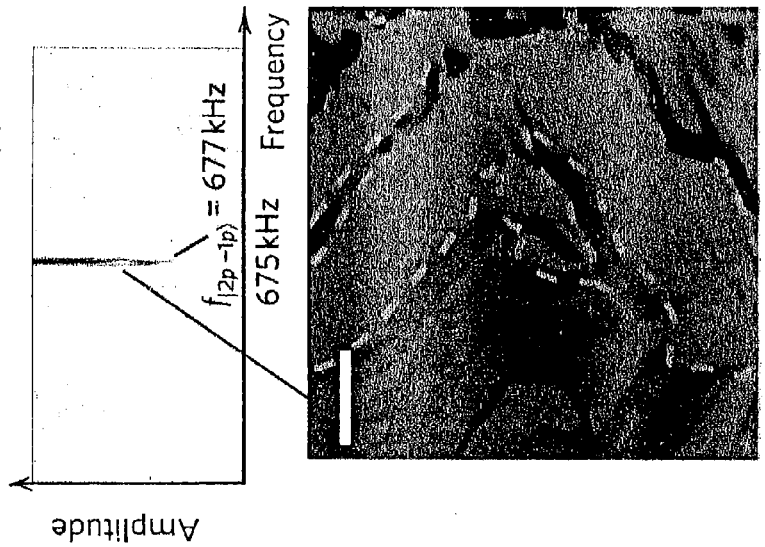
Fig. 6f (2)   Fig. 6h
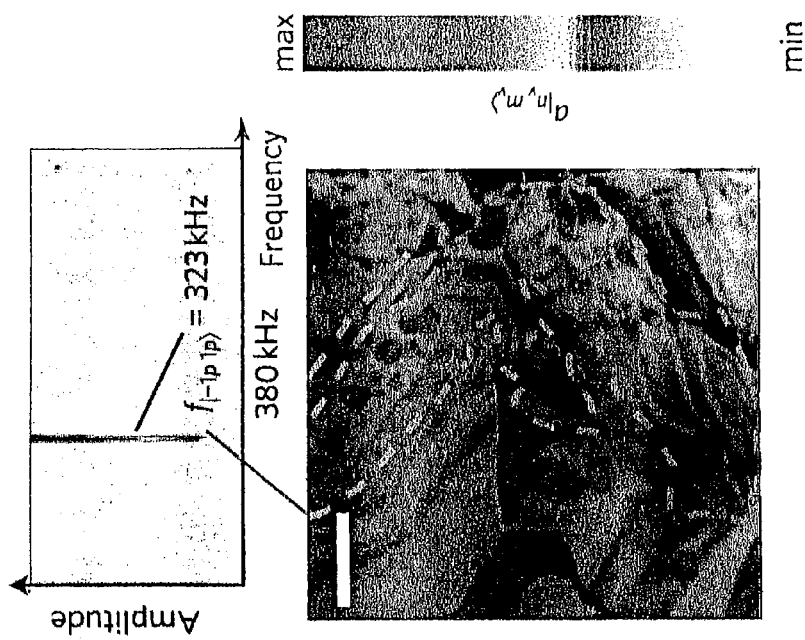
Fig. 6f (1)   Fig. 6g

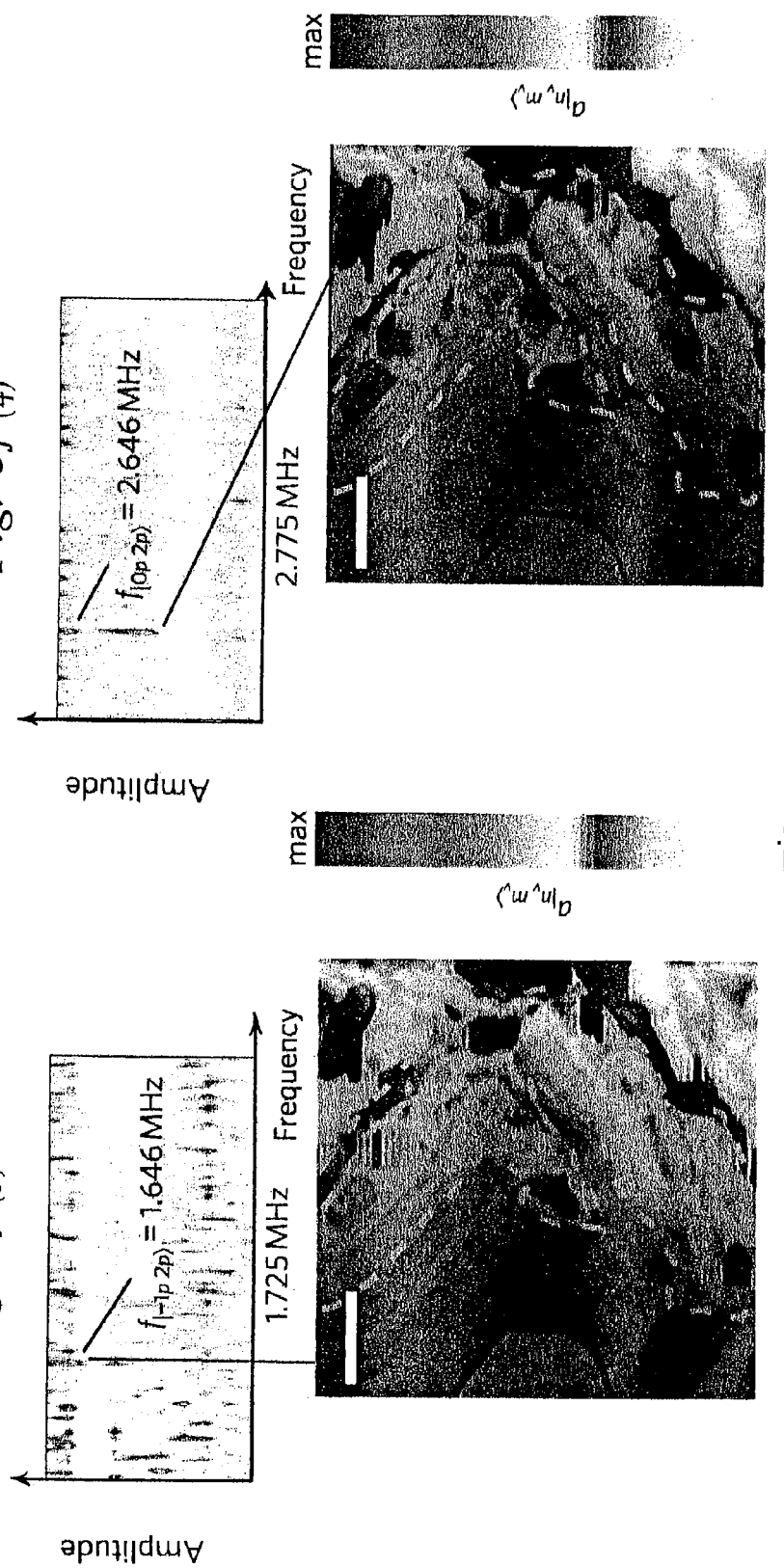

Excitation Frequencies and Amplitudes $\omega_{|1s\ 0p\rangle}=205\text{kHz}$, $a_{|1s\ 0p\rangle}=9\text{Vpp}$ ; $\omega_{|0s\ 1p\rangle}=291\text{kHz}$, $a_{|0s\ 1p\rangle}=7\text{Vpp}$ Excitation Frequencies and Amplitudes $\omega_{|1s\ 0p\rangle}=205\text{kHz}$, $a_{|1s\ 0p\rangle}=9\text{Vpp}$ ; $\omega_{|0s\ 1p\rangle}=291\text{kHz}$, $a_{|0s\ 1p\rangle}=7\text{Vpp}$ Excitation Frequencies and Amplitudes $\omega_{|1s\,0p\rangle}=300\text{kHz},\ a_{|1s\,0p\rangle}=10\text{Vpp}\ ;\ \omega_{|0s\,1p\rangle}=386\text{kHz},\ a_{|0s\,1p\rangle}=10\text{Vpp}$ Excitation Frequencies and Amplitudes $\omega_{|1s\,0p\rangle}=300\text{kHz},\ a_{|1s\,0p\rangle}=10\text{Vpp}\ ;\ \omega_{|0s\,1p\rangle}=386\text{kHz},\ a_{|0s\,1p\rangle}=10\text{Vpp}$ Excitation Frequencies and Amplitudes $\omega_{|1s\,0p\rangle}=300\text{kHz}$, $a_{|1s\,0p\rangle}=10\text{Vpp}$ ; $\omega_{|0s\,1p\rangle}=386\text{kHz}$, $a_{|0s\,1p\rangle}=10\text{Vpp}$ Excitation Frequencies and Amplitudes $\omega_{|1s\,0p\rangle}=300\text{kHz}$, $a_{|1s\,0p\rangle}=10\text{Vpp}$ ; $\omega_{|0s\,1p\rangle}=386\text{kHz}$, $a_{|0s\,1p\rangle}=10\text{Vpp}$

MODE SYNTHESIZING ATOMIC FORCE MICROSCOPY AND MODE-SYNTHESIZING SENSING

This invention was made with government support under Contract No. DE-AC05-00OR22725 awarded by the U.S. Department of Energy. The government has certain rights in the invention.

BACKGROUND OF THE INVENTION

1. Field of the Invention

The present invention relates generally to an analysis system and more particularly to a mode-synthesizing atomic force microscopy system.

2. Discussion of Related Art

Atomic Force Microscopy

Non-destructive, nanoscale characterization techniques are needed to understand both synthetic and biological materials. Atomic force microscopy (AFM) is a well established technique for imaging surface features with nanometer or even sub-nanometer resolution. In atomic force microscopy, a cantilever with a small spring constant is dragged on the surface of a sample. The cantilever has a probe tip capable of contacting the sample with a nanometer contact area. The contact force between the tip and the sample includes short range forces, such as the van der Walls force. Therefore, any small variation in distance between the probe tip and the surface of the sample can result in a large change in the force due to the short range nature of the forces.

When the cantilever is rastered on the top of the surface of the sample, the tip experiences attractive and repulsive forces that depend on the chemical and mechanical properties of the sample. For example, deflection of the cantilever generates a response that creates a spatial force image of the surface with nanometer spatial resolution. However, conventional atomic force microscopy is limited only to surface topography.

Ultrasonic Force Microscopy

In the so-called ultrasonic force microscopy, a microcantilever or a sample is coupled to a mechanical oscillator that drives the microcantilever (or a sample) at a frequency f. The microcantilever has a probe tip that interacts with a surface of a sample. An image may then be acquired from the amplitude and phase of a signal that results from locking onto the cantilever motion with reference to the acoustic wave frequency. Ultrasonic microscopy has been used to study the elastic properties of various materials.

Scanning Near Field Ultrasound Holography (SNFUH)

While atomic force microscopy provides no information concerning the subsurface features of a sample, this limitation can be overcome by the recent development of Scanning Near Field Ultrasound Holography (SNFUH) by Shekawat and Dravid, which can also differentiate materials of different mechanical properties. This technique has recently been shown proficient for localization of embedded nanoparticles in cells, where agglomerated carbon nanohorns and synthesized silica nanoparticles buried in a mouse macrophage were visualized. The sample holder of an atomic force microscope is modified to accommodate a piezoelectric crystal that is vibrated at MHz frequencies. The ultrasonic waves traveling through the sample influence the motion of the atomic force microscope's cantilever that is in contact with the surface of the sample. Since the atomic force microscope's cantilever is independently vibrated by a second piezoelectric crystal at a different frequency than the ultrasonic waves generated by the first piezoelectric crystal, the system creates a new mode at the difference frequency that can be monitored using a position sensitive detector (PSD) of the atomic force microscope. When the phase of the signal with respect to the difference in the exciting frequencies of the two piezoelectric crystals is displayed as a function of spatial location of the scanning cantilever tip, the phase image map shows contrast due to acoustic impedance variation and material inhomogeneity of the subsurface or surface features.

OBJECTS AND SUMMARY OF THE INVENTION

A first aspect of the present invention regards an analysis system that includes a first excitation source that applies to a sample a first set of energies at a first set of frequencies. The analysis system further includes a second excitation source, independent of the first excitation source, that applies a second set of energies at a second set of frequencies to a probe, wherein the first set of energies and the second set of energies are simultaneously applied to the sample and the probe, respectively, and form a multi-mode coupling. The analysis system includes a detector that detects dynamics of the probe from which an effect of the multi-mode coupling can be obtained.

A second aspect of the present invention regards a method of analyzing a sample that includes applying a first set of energies at a first set of frequencies to a sample and applying, simultaneously with the applying the first set of energies, a second set of energies at a second set of frequencies to a probe, wherein the first set of energies and the second set of energies form a multi-mode coupling. The method further includes detecting an effect of the multi-mode coupling.

A third aspect of the present invention regards a sensor system that includes a first cantilever having a first end and a first excitation source that applies to the first cantilever a first set of energies at a first set of frequencies. The system further includes a second cantilever having a second end, wherein the second end is adjacent to the first end and a second excitation source, independent of the first excitation source that applies a second set of energies at a second set of frequencies. The first set of energies and the second set of energies are simultaneously applied to the first cantilever and the second cantilever, respectively, and form a multi-mode coupling. The system further includes a detector that detects an effect of the multi-mode coupling.

A fourth aspect of the present invention regards a method of analyzing a sample that includes applying a first set of energies at a first set of frequencies to a sample via a first cantilever and applying a second set of energies at a second set of frequencies to the sample via a second cantilever, wherein the first and second cantilevers are adjacent to one another. The first set of energies and the second set of energies are simultaneously applied to the first cantilever and the second cantilever, respectively, and form a multi-mode coupling. The method further includes detecting an effect of the multi-mode coupling.

A fifth aspect of the present invention regards an analysis system that includes a first excitation source that applies to a sample a first set of energies at a first set of frequencies and a second excitation source, independent of the first excitation source, that applies a second set of energies at a second set of frequencies to the sample. The first set of energies and the second set of energies are simultaneously applied to the sample, and form a multi-mode coupling. The analysis system further including a probe that contacts the sample and a detector that detects dynamics of the probe from which an effect of the multi-mode coupling can be obtained.

A sixth aspect of the present invention regards a method of analyzing a sample that includes applying a first set of energies at a first set of frequencies to a sample and applying simultaneously with the applying the first set of energies a second set of energies at a second set of frequencies to the sample. The first set of energies and the second set of energies form a multi-mode coupling. The method further includes detecting an effect of the multi-mode coupling via a probe that contacts the sample.

One or more advantages that are present in one or more aspects of the present invention are:
 access to new mechanical information on the sample;
 gentleness to soft samples;
 takes advantage of the nonlinear nature of the probe-sample interaction;
 simultaneous image acquisition; and
 surface and subsurface information.

Further characteristics and advantages of the present invention will become apparent in the course of the following description of an exemplary embodiment by the drawings.

BRIEF DESCRIPTION OF THE DRAWINGS

FIGS. 6a-j show simultaneous C-mode imaging of a sample using the analysis system of FIG. 3 and corresponding modes excited in the system and used for imaging (FIGS. 6e(1)-(4), f(1)-(4));

DETAILED DESCRIPTION OF THE PREFERRED EMBODIMENTS

In the embodiments of the invention described hereinafter, like numerals will be used to identify like elements. Before going into the details as to the various embodiments of the present inventions, the general principles of the inventions, as presently understood, are discussed below. In particular, the present invention regards variations on atomic force microscope systems and techniques of their use that can obtain a range of surface and subsurface information by exploiting the nonlinear nanomechanical coupling between the cantilever probe and the sample. These systems and techniques come under the guise of so-called mode-synthesizing atomic force microscopy (MSAFM), which relies on multi-harmonic forcing of the sample and the probe. A rich spectrum of first- and higher-order couplings is accessible, providing a multitude of new operational modes for atomic force microscopy. The capabilities of the systems and techniques can be demonstrated by examining nanofabricated samples and plant cells.

Figure 1:
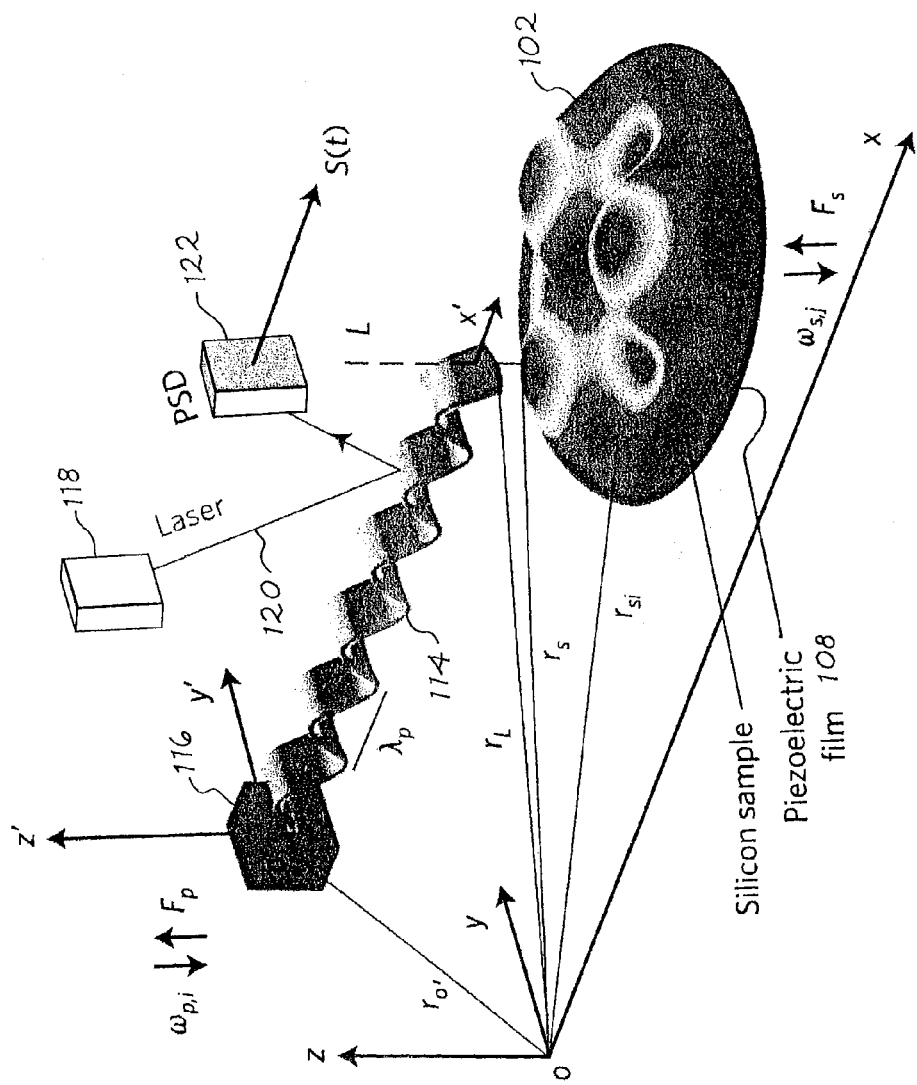
FIG. 1 schematically shows a first embodiment of an analysis system in accordance with the present invention.

In MSAFM, a silicon microcantilever 114 interacts with a surface of interest of a sample 102 via a van der Waals potential (and often with contributions from other interactions such as thermomolecular, electrostatic, Casimir, etc.) prevailing in the nanometer interfacial region between the surface $r_s$ and the cantilever probe tip 112 located at $r_L$ relative to origin O, as partially shown in FIG. 1. The left boundary of the microcantilever 114 (length L) is fixed with respect to the origin $r_o$ of the accelerated reference frame 0' x' y', but oscillates with respect to the inertial reference frame Oxy. The microcantilever 114 is driven by mechanical oscillator, such as PZT film 116, at a frequency $f_p$ so as to exert a force $F_p$ on the microcantilever 114. Similarly, the sample 102 is driven by PZT film oscillator 108 at a frequency $f_s$ so as to generate a force $F_s$ on the sample 102. The forces $F_p$ and $F_s$ result in the excitation of an elastic mode of the sample 102 and the microcantilever 114.

The motion of the sample 102 that is subjected to frequency $f_s$ is measured with respect to reference frame Oxy shown in FIG. 1. Such measurement is accomplished by use of a light source, such as a laser diode 118, that generates a beam 120 of light directed toward the microcantilever 114 and is reflected toward a detector, such as a four-quadrant position sensitive photodetector 122. The laser 118 and the position sensitive photodetector 122 are used to measure the dynamics of the system in time domain by generating a signal S(t). An embedded inhomogeneity at $r_{si}$ modifies the dynamics of $r_s$ affecting the signal S(t) through a multiple-order coupling C that is solely induced by a nonlinear interaction between the microcantilever probe 114 and the sample 102. The wavelength of the high frequency $\omega_p$ oscillations of the microcantilever 114 is denoted by $\lambda_p$.

Figure 2:
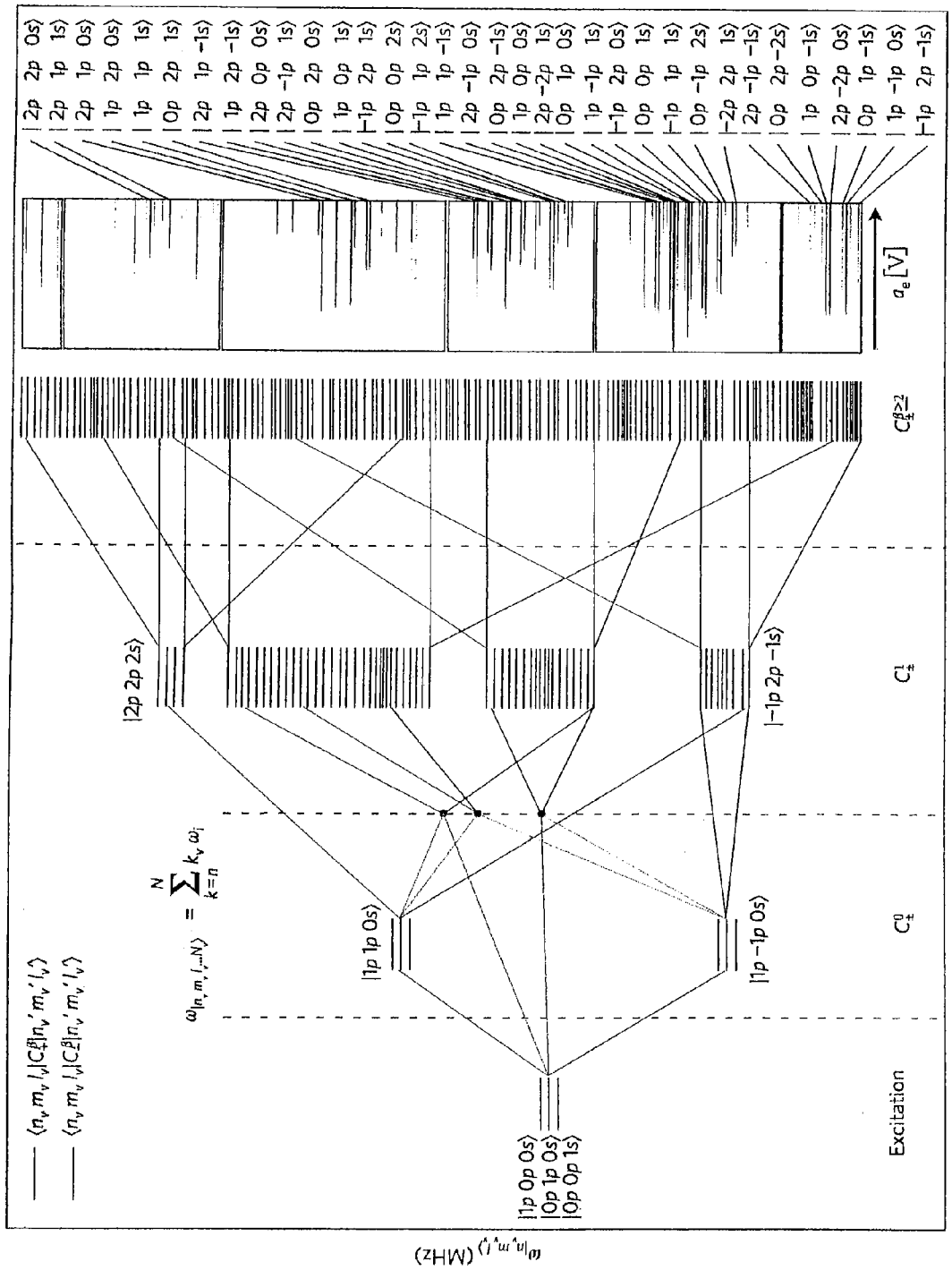
FIG. 2 shows a 3-stimuli (two for the probe and one for the sample) diagram representing all dynamic states created by a representative coupling C generated by the analysis system of FIG. 1.

The multiple-order coupling C is provided by the much faster (than the excitation time scales) interfacial electronic interactions. The coupling C allows synthesis of a multitude of new operational modes, or C-modes, limited only by the system and measurement bandwidth. The vast dynamic landscape of the multiple-order coupling C renders MSAFM to be drastically different than existing modalities. To better describe the synthesized modes, a Dirac-like notation is introduced for the states of the system (C-modes) and arrange in a Groterian-like diagram as shown in FIG. 2.

MSAFM is founded upon exerting a multi-harmonic force $F_s$ on the sample 102. Similarly, a multi-harmonic force $F_p$ is applied to the microcantilever 114. The two forces are given below:

$$F_s = F_S = \Sigma_j a_{s,j} \sin(2\pi f_{s,j} t + \phi_{s,j}) \quad (1)$$

$$F_p = F_p = \Sigma_i a_{p,i} \sin(2\pi f_{p,i} t + \phi_{p,i}), \quad (2)$$

wherein when the microcantilever 114-sample 102 separation d $(=|r_L - r_s|)$ is reduced beyond a threshold, the nonlinear and nonzero interaction C creates a time domain signal S(t) that represents the dynamic state of the microcantilever 114, as shown in FIG. 1.

In general, the system shown in FIG. 1 is a two oscillator system. There is an example in atomic physics of a system that involves two oscillators that is helpful in explaining the coupling process of the system shown in FIG. 1. In particular, in the case of a hydrogen atom, the electron and the nucleus constitute two oscillators that interact with one another via a Coulomb potential to generate the discrete quantum states InIm>. In an analogous manner, MSAFM has two oscillators, the microcantilever probe 114 and the sample 102, that interact via a van der Waals potential so as to generate the well-defined states $I n_v m_v I_v \ldots >$. The number of excitation states determine the number of integers ($n_v, m_v, I_v, \ldots$), which will populate a given state I·>. Then assigning n, m, I, ... =0, ±1, ±2, ..., and an index v=s, p, where s and p refer to the sample 102 and the microcantilever probe 114, respectively, the term $I n_v m_v I_v \ldots >$ denotes a state with a frequency $\omega_{|nvmvIv \ldots >} = n_v \omega_{v,1} + m_v \omega_{v,2} + I_v \omega_{v,3} + \ldots$ and an amplitude $a_{|nvmvIv \ldots >}$, where $\omega_{v,i} = 2\Pi f_{v,i}$. Now, representing each Fourier component of the signal S, symbolically as $I n_v m_v I_v \ldots >$, MSAFM utilizes the amplitude and phase of S(t), by simultaneously locking onto the frequency of any given number of C-modes, that is, $\omega_{|nvmvIv \ldots >}$.

As an application of the above theory, suppose i=1, 2 and j=1 in $F_p$ and $F_s$, a striking 62 C-modes are predicted as mapped in FIG. 2. Here, a selected 34 experimentally measured C-modes are also shown, for which the contour plots in the fifth column collectively represent the measured amplitudes amplitude $a_{|nvmvIv \ldots >}$ as a function of the amplitude of the excitations. The first order coupling $C^0$, mixes the three excitation modes $I0_p 0_p 1_s,>$, $I0_p 1_p 0_s,>$ and modes $I1_p 0_p 0_s,>$ to give rise to 6 modes via sum and difference generation, whereas the second order coupling $C^1$ mixes the previous modes to create the 62 modes by further sum and difference generation. Consequently, the coupling C may be envisioned as being analogous to the susceptibility $\chi$ in nonlinear optics, albeit the role of a material nonlinear polarizability is played by the nonlinear interfacial forces in MSAFM. Juxtaposition of the modes in the proposed Groterian-resembling diagram, in fact surpasses a simple storing utility. The diagram clearly keeps track of whether a given mode is a result of a summation or subtraction, and whether the mode is a result of a first coupling or a higher order coupling. In addition, the diagram also includes the information about the origin of the excitation (p for probe, s for sample). Furthermore, the modes are vertically dispersed according to their frequency.

It should be noted that while FIG. 1 shows one set of vibrational energies/frequencies applied to the microcantilever 114 and another set to the sample 102, an advantage of the present invention is the creation of the multi-mode coupling effect mentioned previously. Accordingly, the present invention encompasses systems that generate excitation energies/frequencies via other means, such as electromagnetic oscillations, and applying multiple excitation energies/frequencies to the sample 102.

In summary, the analysis system described above with respect to FIGS. 1-2 presents a new modality of force microscopy that can be of significant importance for nanoscale characterization of material. Exploiting the nonlinear interactions, in a single run, MSAFM is capable of delivering a myriad (FIG. 2) of nanoscale features not previously attainable. Controlled use of the synthesized modes for surface and subsurface characterization of poplar cells, per the discussion to follow regarding FIGS. 5a-h, demonstrate the versatility of the methodology presented herein and suggest potential application in studying complex samples, such as an organic system that exhibits a variety of interrelated chemical, morphological, and mechanical properties, as opposed to simple samples characterized rather with homogeneity, uniformity, and isotropicity. It is believed that both attractive and repulsive forces are at play under MSAFM. In addition, within the measurement bandwidth, the $C^\beta$ modes are all fully operational. MSAFM capitalizes on the full range of coupling C, and utilizes both amplitude and phase towards image formation, and therefore many opportunities remain to be explored.

Figure 3:
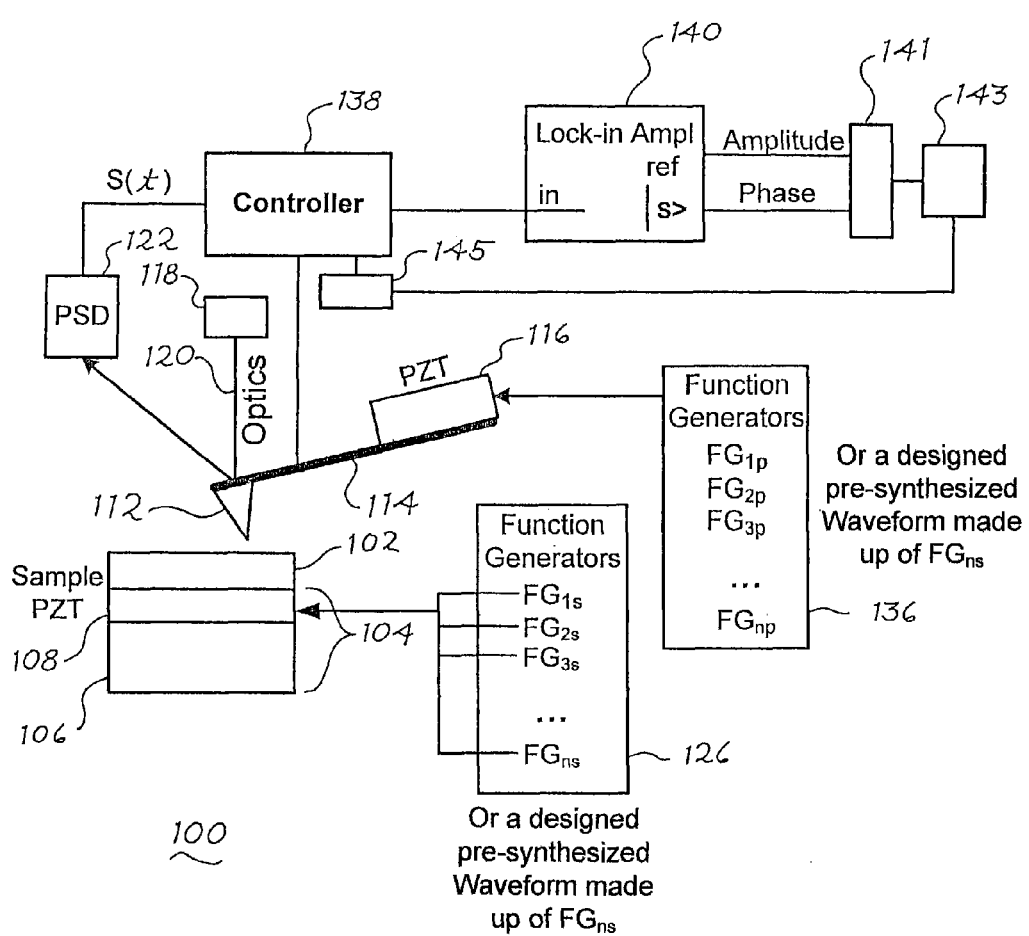
FIG. 3 schematically shows a second embodiment of an analysis system in accordance with the present invention.

With the above discussion of the theory behind the present invention in mind, there are several embodiments possible to exploit the present invention. For example, an analysis system 100 is shown in FIG. 3. In this embodiment, the sample 102 is attached to a piezoelectric sample holder 104 capable of applying a first set of vibrational energies by vibrating the sample 102 at a few kHz to several tens of MHz frequencies. The sample holder 104 includes a base 106 and a first excitation source, such as a bimorph/piezoelectric crystal (PZT) oscillator 108. The PZT oscillator 108 is glued to the base 106 at a location that enables excitation of the sample 102 from the bottom of the sample 102, in order to access subsurface information. The frequencies generated by the PZT oscillator 108 can be in the range of a few kHz to tens of MHz, wherein the limit on its frequency is imposed by the bandwidth of the other pieces of equipment of the system 100.

The sample can be either organic or inorganic in nature. In the case of an organic sample, examples of the sample can be materials important for bioenergy production, such as *Populus*. The thickness of the samples can be varied from a fraction of a μm (micrometer) to several tens of μm. The sample and the glass slides are immobilized on the base 106 using glue or an adhesive film typically used in Scanning Electron Microscopy.

As shown in FIG. 3, the sample 102 is in contact with a tip 112 of a microcantilever 114 that collectively define a probe of an atomic force microscope (AFM). The position of the probe with respect to the sample base 106 can be changed in the x-y direction (depending on the AFM system used, either the cantilever 114 or the sample 102 can be moved in x-y direction). The AFM can be a commercial product such as the Multimode system made by Veeco with a Nanoscope III controller. As shown in FIG. 3, a second excitation source, such as a PZT oscillator 116, is coupled to the microcantilever 114. A light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the PZT oscillator 108 is controlled by n function generators $FG_{i_s}$ (i=1, 2, 3, ... n) represented collectively by box 126 so that the PZT oscillator 108 generates multiple vibrational energies in the form of waves at multiple frequencies $f_{is}$ and amplitude $a_s$. The waves have frequencies $f_{is}$ that range from a few kHz to several tens of MHz. The waves travel through the sample 102 and are sensed up by the microcantilever 114. The amplitude and phase of a wave at a given frequency are detected via the motion of the tip 112. Note that function generators $FG_{is}$ 126 can be replaced by a single programmable function generator that can handle multifrequency waveforms.

As shown in FIG. 3, a second PZT oscillator 116 is glued to the microcantilever 114. The PZT oscillator 116 is connected to n function generators $FG_{ip}$ (i=1, 2, 3, . . . n) represented collectively by box 136 so that the PZT oscillator 116 generates multiple vibrational energies in the form of waves at multiple frequencies $f_{ip}$ and amplitude $a_p$. The frequencies $f_{ip}$ are generated independently of the frequencies $f_{is}$. The frequencies $f_{ip}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_1$ 136 can be replaced by a single programmable function generator that can handle multifrequency waveforms.

Note that the oscillators 108 and 116 may be PZT films available from Physik Instrumente (model PIC255). Both films can be wirebonded to accept multiple driving waves from the function generators 126, 136. Using a network analyzer, impedance measurements can be carried out to obtain the frequency response of the PZT oscillators 108 and 116 and determine their resonances. Such information is needed for the determination of the total experimental and measurement bandwidth and also for quantitative measurements.

In addition, the microcantilever 114 may be selected to have different stiffnesses and geometries. In the case of a soft microcantilever, it can, for example, have a stiffness of 0.06 N/m that has a triangular geometry. An example of such a microcantilever is model DNP-S available from Veeco Probes. The soft microcantilever can be made of silicon nitrite with a gold coating. In the case of a stiff microcantilever, such a microcantilever can have a rectangular geometry and be made of silicon. An example of a stiff microcantilever is made by Olympus (model OMCL-AC160 TS-W2).

Figure 4:
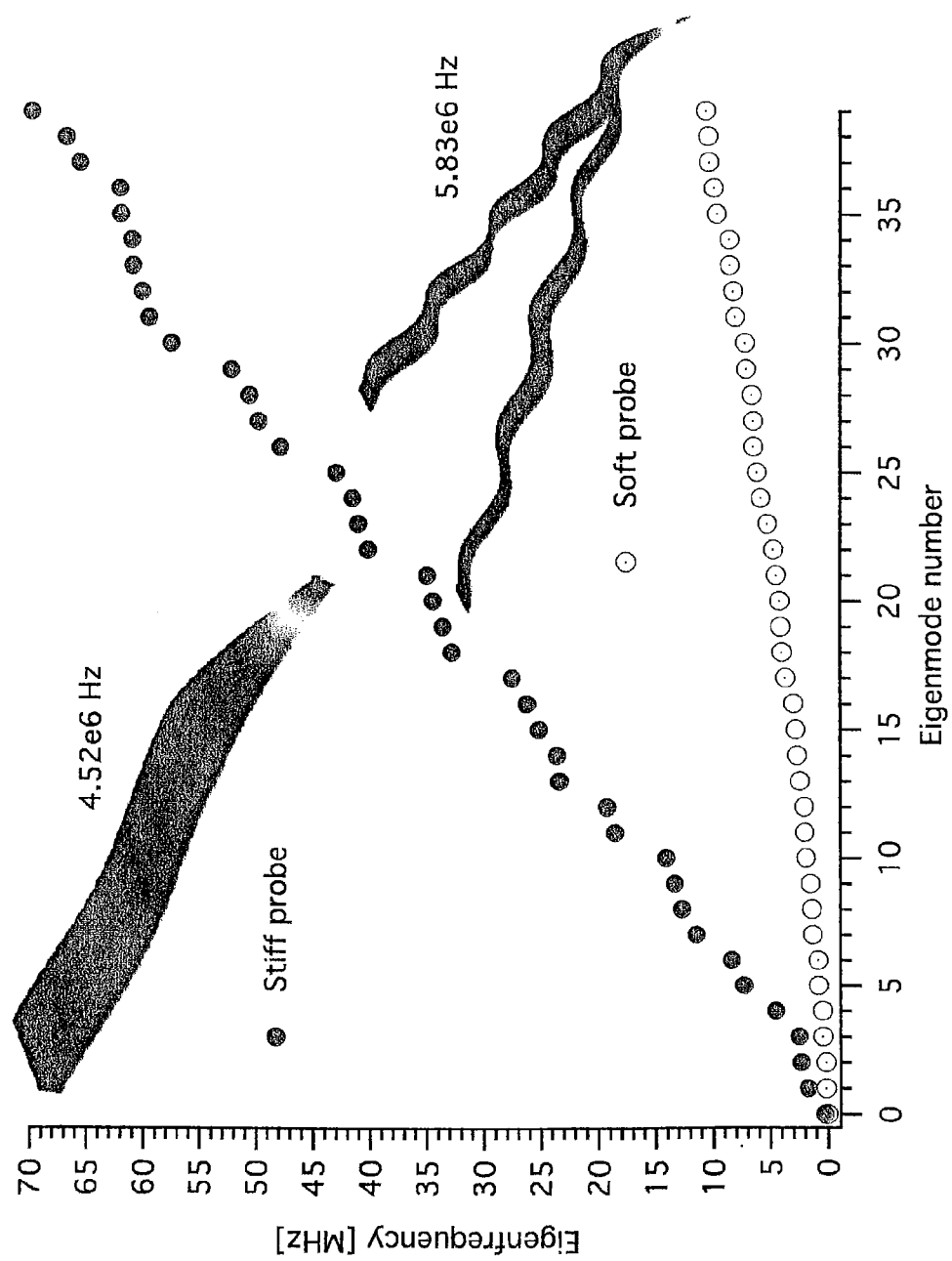
FIG. 4 shows a plot of eigenfrequency vs. eigenmode number for different types of probes that can be used with the systems of FIGS. 1-3 and 6-12

The resonances in the oscillatory motion of the microcantilevers 114 can be obtained analytically for simpler geometries, and computationally otherwise. For example, the eigenfrequencies and eigenmodes of both rectangular (stiff) and triangular (soft) silicon cantilevers 114 can be calculated as shown in FIG. 4. Note that the microcantilever 114 possesses an infinite number $\kappa=1, 2, \ldots$ of eigenmodes, some of which can resonantly be excited. Thus, by the resonance frequency, it corresponds to an actual excited eigenmode of the probe, whereas the off-resonance response of the cantilever 114 is only a result of the propagation of the forced oscillations of the piezoelectric bimorph. In MSAFM, the motion of the left boundary of the cantilever 114, as shown in FIG. 1, appears as a time dependent function representing a driving term in the partial differential equation that describes the dynamics of the probe in the stationary system Oxyz in FIG. 1.

The free spectra of the used cantilevers, that is, for a large probe-sample separation (d=$|r_L-r_s|$ large in FIG. 1) and ($a_s$, $a_p$)=(0, 0) (both piezoelectric crystals turned off), are measured to be $f_p^k$=(23, 144, 403, 790, 1307, . . . ) kHz for a soft probe with a spring constant k=0.06 N/m, and $f_p^k$ =(380, 1800, . . . ) kHz for a stiff probe with spring constant k=42 N/m, which is in agreement with the computational results of FIG. 4. The computed eigenfrequencies and eigenmodes of FIG. 4 regard the situations that involve a stiff rectangular probe that is 160 μm long, 50 μm wide, and 4.6 μm thick, and a soft triangular cantilever that is 180 μm long, 18 μm wide, and 0.6 μm thick. As expected, for the same eigenmode number, the stiff probe exhibits much faster dynamics. The insets show the computationally determined transversal mode-shapes at selected eigenfrequencies. The shaded scale restates the deformation of the probes.

A coupling C, such as that described previously, is achieved by the analysis system 100. The coupling C is determined from the signal S(t) generated by detector 122. The controller 138 monitors the feedback loop that controls the Z-position of the microcantilever 114 and converts the signal S(t) into display of a 2D image. The signal is sent to a spectrum analyzer 145 to identify the spectrum of frequencies representative of the multi-order coupling in the Fourier space. The signal is sent to a lock-in amplifier 140 as well to monitor the amplitude and phase a given component of the S(ω) (i.e. one of the peaks observed on the spectrum analyzer), relative to the nonlinear multi-order coupling resulting from the excitation of the microcantilever 114 and the sample 102 brought in contact with one another. The lock-in amplifier 140 sends amplitude and phase information/signals to a processor 141 (the processor 141 may be included in the controller 138) that determines an image of the sample 102 corresponding to the response of the system at the given frequency used as reference in the lock-in amplifier 140. The spectrum determined by spectrum analyzer 145 and the image of the sample 102 determined by processor 141 can be displayed on display 143.

Other analyses performed by the analysis system 100 are possible. For example, the system 100 can be operated using the AFM and data acquisition software such as Labview, and a Signal Access Module (SAM from Veeco), which allow external signals to be sent back to the controller 138 to be displayed at display 143. The information provided through the AFM software is: 1) the topography of the sample, 2) the response of the sample to the mechanical oscillations for each component (frequency) generated by the nonlinear coupling. The information provided through the data acquisition system software will include maps of the contribution of a given frequency to the complex coupling between the tip 112 of the microcantilever 114 and the sample 102. This will include amplitude and phase measurements with respect to the C-modes over the (driving) frequency ranges and (driving) amplitudes ranges. It can also include monitoring of the evolution of the amplitude and phase of the signal at a given frequency as a function of the position of the microcantilever 114 with respect to position (X, Y, Z) of the sample 102 or with respect to time. The study of the deflection of the microcantilever 114 as a function of Z is commonly called a "force curve measurement" and is used to study the mechanical properties of the sample 102.

Figure 5A:
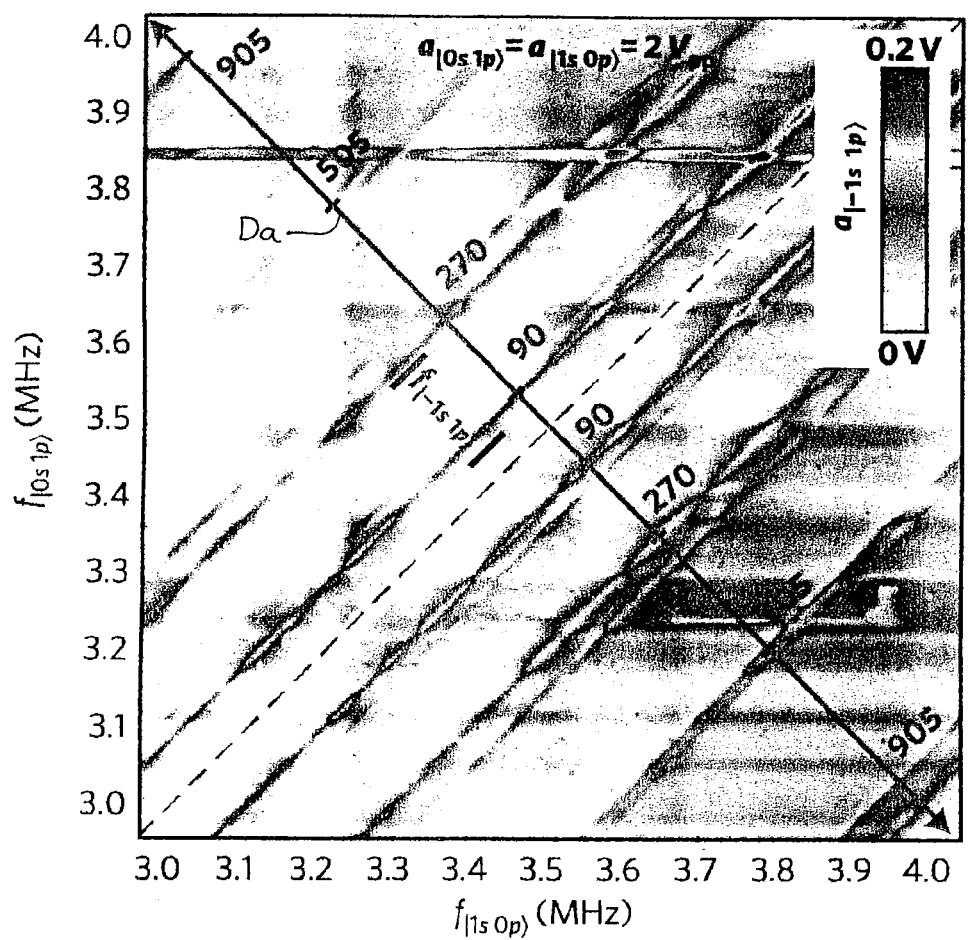
FIGS. 5a-d show spectral and amplitude dependencies for various selected C-modes using the analysis system of FIG. 3.
Figure 5B:
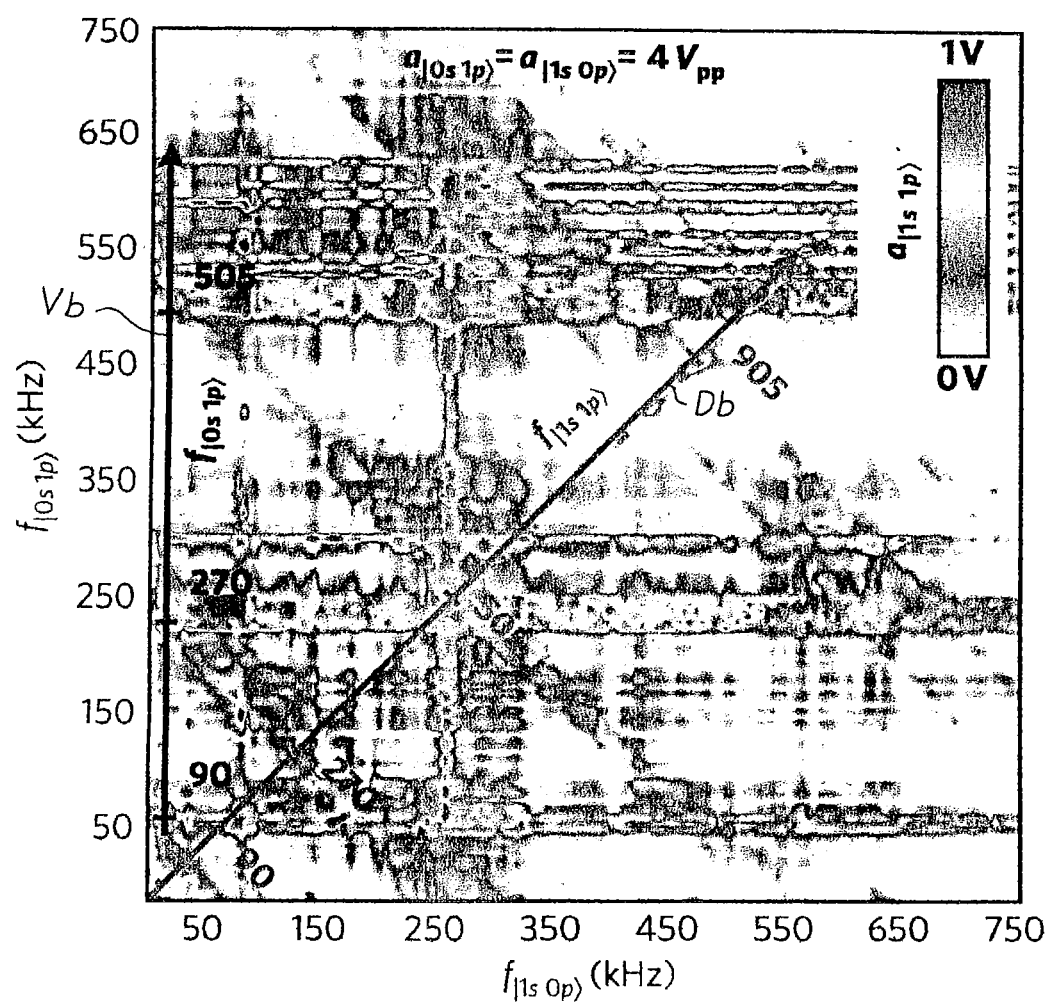
Figure 5C:
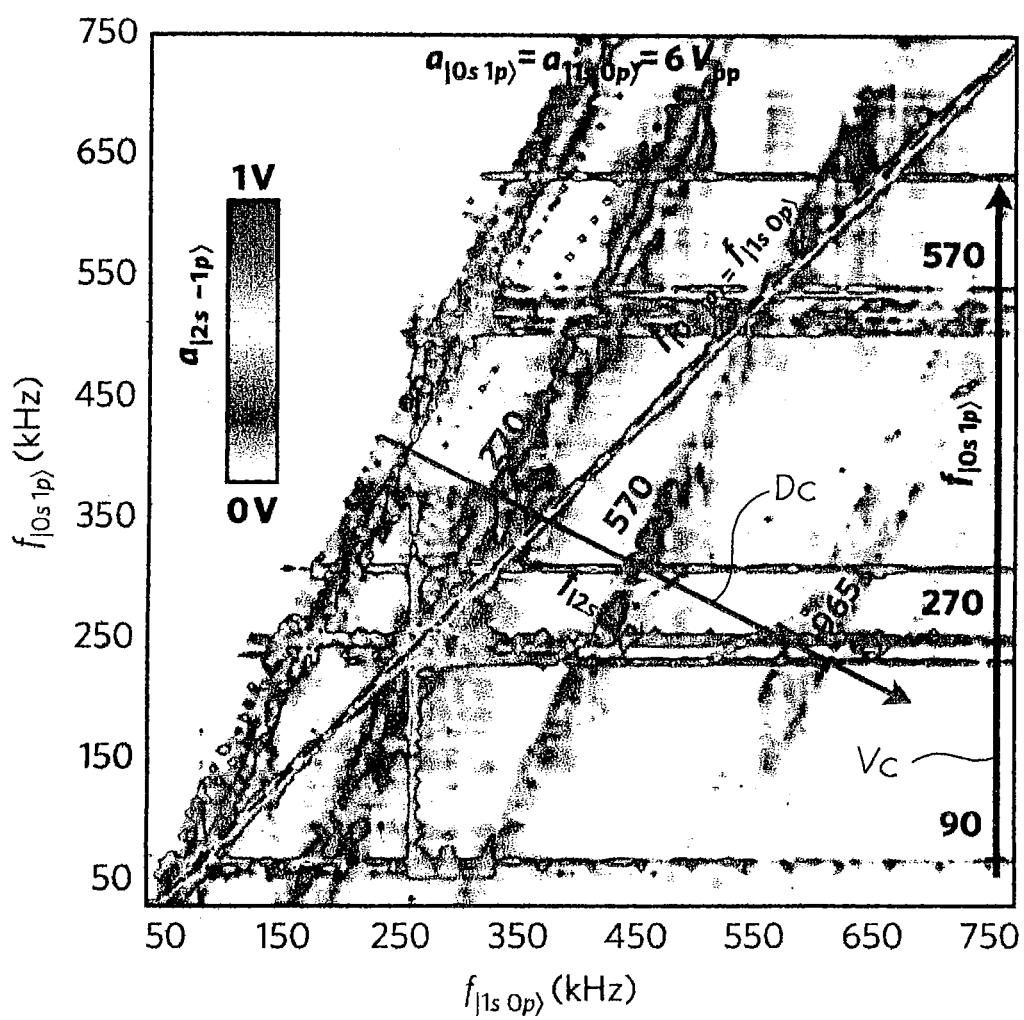
Figure 5D:
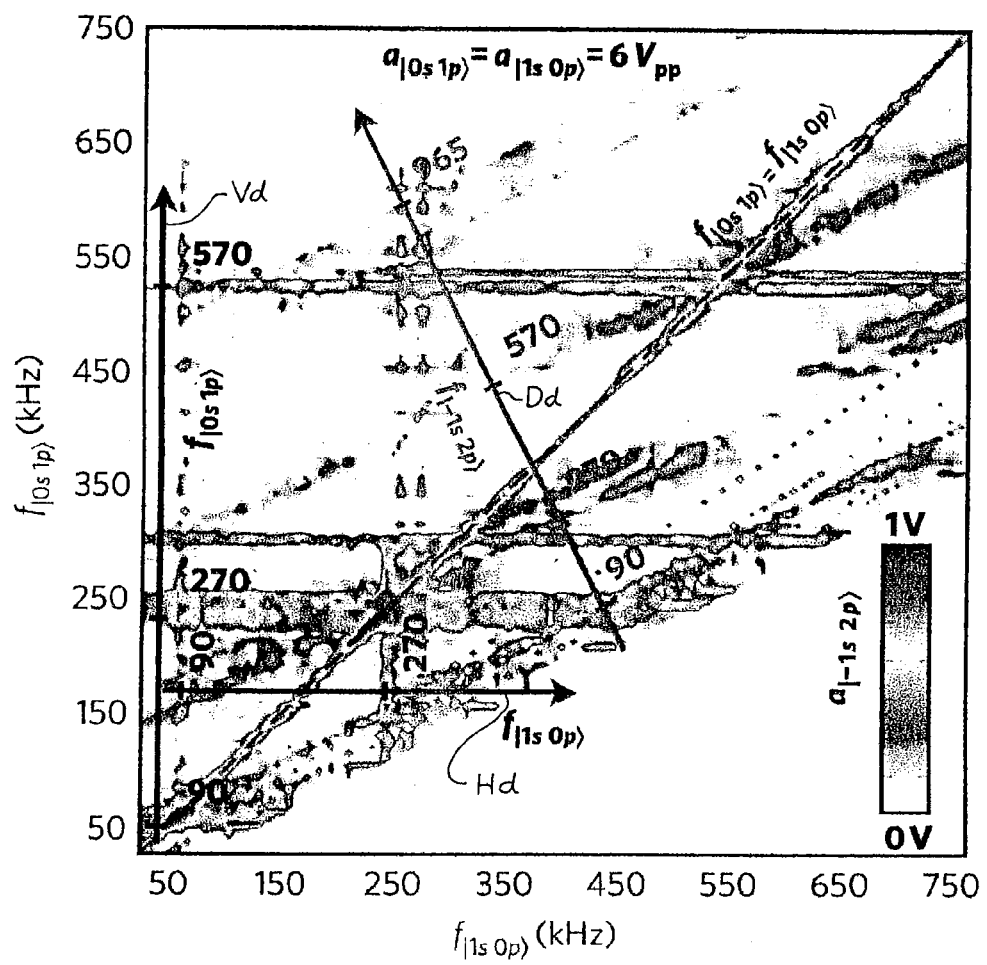

Using the analysis system 100, the parameter dependence of selected C-modes can be demonstrated. For example, FIG. 5a shows for fixed and equal driving amplitudes $a_{p,1}=a_{s,1}$, the variation of the amplitude of the $C^0$-mode $|-1_s1_p>$ for $f_{l-1s1p>}$ varying from 25 kHz to 1 MHz. FIG. 5b shows amplitude dependence of the $C^0$-mode $|1_s1_p>$ for $f_{1s1p>}$ varying from 100 kHz to 1.5 MHz at higher excitation amplitudes. FIGS. 5c-d show the dependence of selected $C^1$-modes ($|2_s-1_p>$ (c), and $|-1_s2_p>$ (d)) upon the excitation frequency for $f_{l2s-1p>}$ and $f_{l-1s\,2p>}$ varying from 50 kHz to 1.5 MHz. The excitation amplitudes are annotated on the top portion and a scale bar is provided to categorize the contour levels. The exhibited bands can be identified to correspond to (in-contact) $\omega^\kappa$, $\kappa=1$, 2, .... The vertical lines formed in FIGS. 5a-d are indicative of a maximum in the displacement of the microcantilever 114 at any of the $\omega_{|nm>}$ when the driving frequency applied to the probe corresponds to one of the $\omega^\kappa$. For example, the vertical lines $V_b$, $V_c$ and $V_d$ of FIGS. 5b-d, respectively, denote cases wherein the frequency $f_{|0s1p>}$ matches a resonance frequency of the microcantilever. The diagonal lines $D_{a-d}$ denote the states $|f_{1s}-f_{1p>}|$, $|f_{1s}+f_{1p>}|$, $|2f_{1s}-f_{1p>}|$, and $|2f_{1p}-f_{1s>}|$, respectively, matching with a resonance frequency of the microcantilever. The horizontal line $H_d$ of FIG. 5d denote a case wherein the frequency $f_{|1s\,0p>}$ matches a resonance frequency of the microcantilever.

Figure 6B:
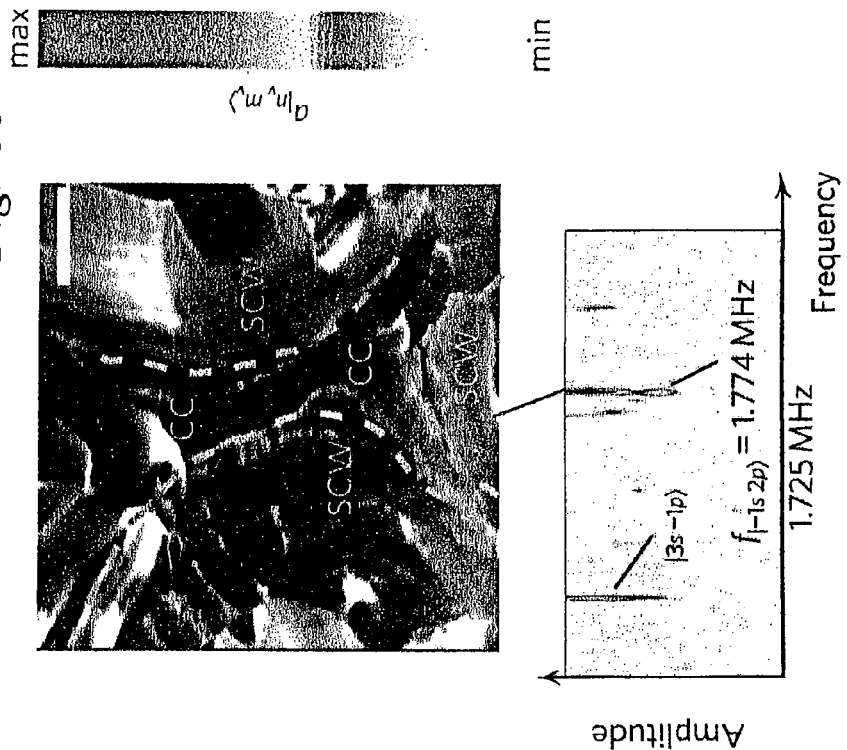
Figure 6A:
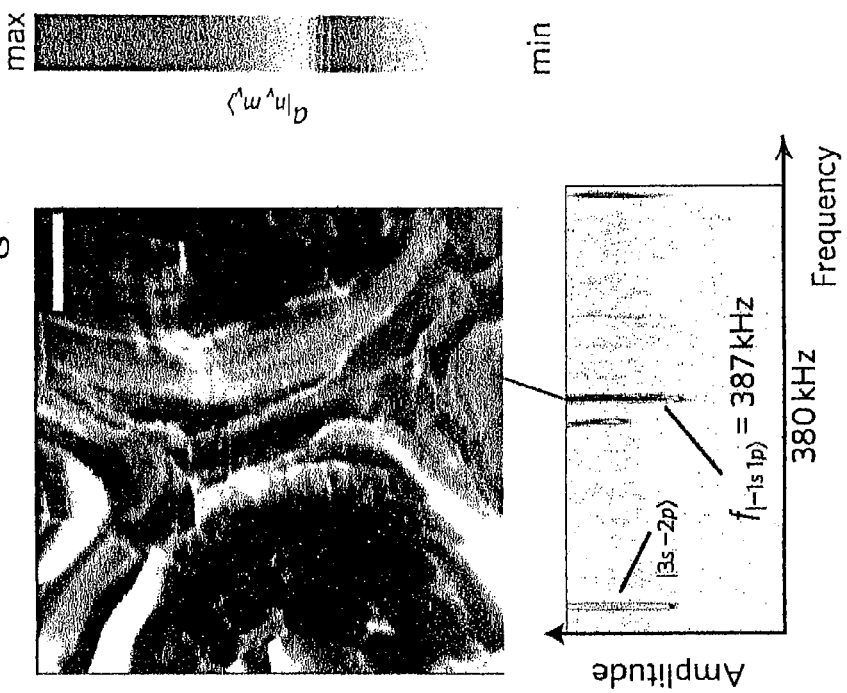

To demonstrate how MSAFM analysis system 100 can successfully access new dimensions of sample information, suppose two sets of C-modes are used to image various layers of the cell walls of a sample made of poplar wood. FIGS. 6a-h show contour plots of partial spectral windows containing the invoked C-modes. In the first set, shown in FIGS. 6(a-d), the participant modes include $\text{Inm>}=|-1_s1_p>$[FIGS. 6(a,e(1))], $|-1_s2_p>$ [FIGS. 6(b,e(2))], $|1_s1_p>$[FIGS. 6(c,e(3))], and $|0_s2_p>$[FIG. 6(d,e(4))] originating from i=j=1, while FIGS. 6(g-j) display images acquired by $|nm\rangle = |-1_p\,1_p>$[FIGS. 6(g,f(1))], $|2_p-1_p>$ [FIGS. 6(h,f(2))], $|-1_p2_p|$[FIGS. 6(i,f(3))], and $|0_p2_p>$ [FIG. 6(j,f(4))] originating from i=1,2, and j=0 (i.e., no subsurface contribution). As shown in FIG. 6b, the secondary cell wall (SCW), the cell corner (CC), and the middle lamella (L), reveal distinct features of the complex organic matrix. The center frequency for each window in FIGS. 6(e(1)-(4),f(1)-(4)) appears below the frequency axis. In FIGS. 6(f-j), the C-modes from the excitation of the probe with two independent waves but maintaining a stationary sample. The cell wall regions and the lamella can be identified from the complementary information contained by each image.

Figure 7:
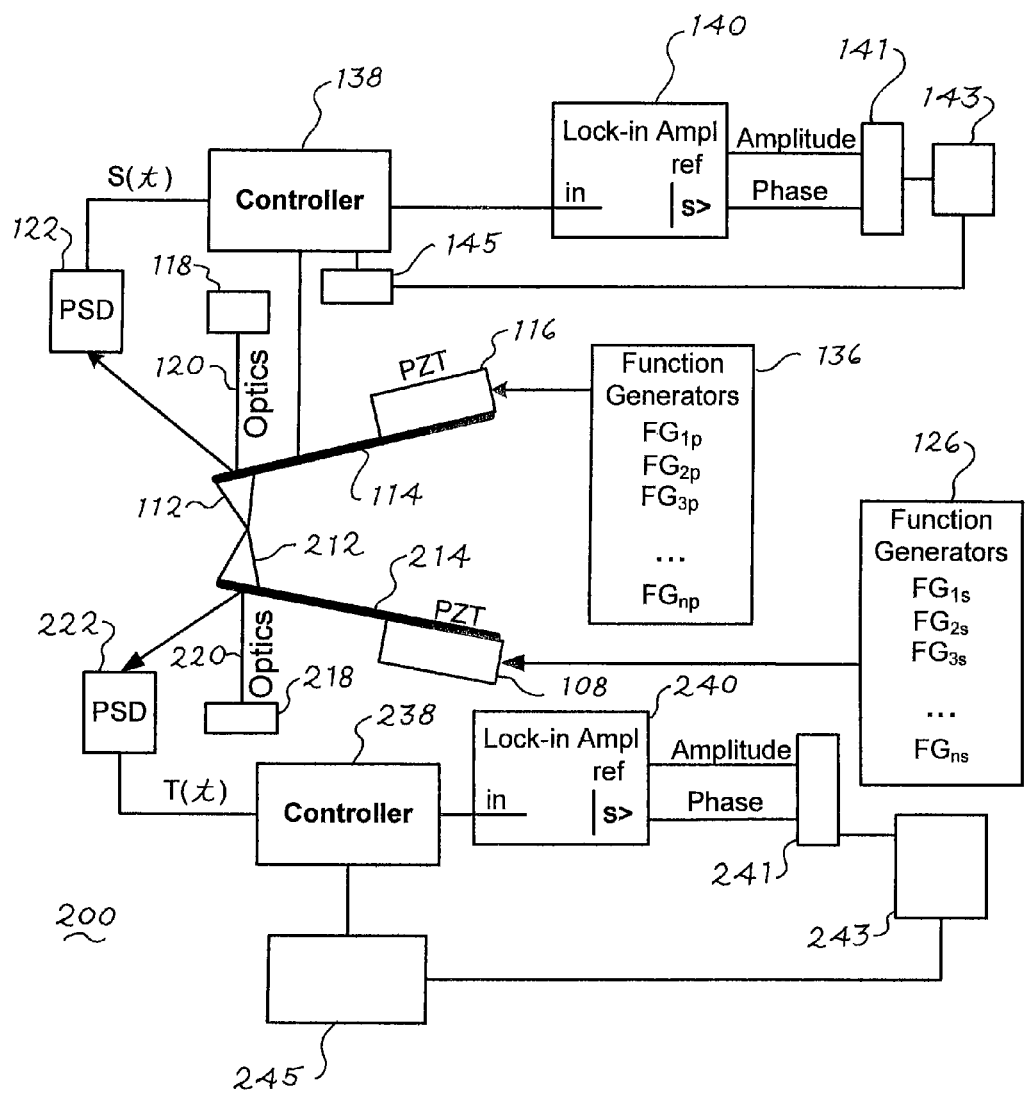
FIG. 7 schematically shows an embodiment of a sensor system in accordance with the present invention.

Another analysis system is shown in FIG. 7. As shown in FIG. 7, sensor system 200 is a variation of analysis system 100, wherein sample 102 has been replaced by a second microcantilever 214 that may or may not include a tip 212. Accordingly, the molecules in the environment will be "the sample." The spacing between the microcantilevers 114 and 214 is not more than a few tens of nanometers.

As mentioned previously, the sensor system 200 includes a second microcantilever 214. An excitation source, such as PZT oscillator 108, is glued to an end of the second microcantilever 214 opposite to the end at which the tip 212 is attached. The PZT oscillator 108 can generate vibrational energies having frequencies in the range of a few kHz to tens of MHz, wherein the limit on its frequency is imposed by the bandwidth of the other pieces of equipment of the system 200.

A light source, such as laser diode 218, generates a beam 220 of light that is directed toward the microcantilever 214 and is reflected toward a detector, such as a four-quadrant photodetector 222. The reflected beam contains information regarding the deflection undergone by the microcantilever 214. A mirror or other optical elements may direct the reflected light toward the photodetector 222. Besides the above described optical deflection system, it would be possible to use a piezoresistive or piezoelectric method, in which case the microcantilever 214 would be of different composition.

As shown in FIG. 7, the microcantilever 214 is in contact with a tip 112 of a microcantilever 114 of an atomic force microscope (AFM). The AFM can be a commercial product such as the Multimode system made by Veeco with a Nanoscope III controller (but it is not restricted to this model).

As shown in FIG. 7, another excitation source, such as a PZT oscillator 116, is coupled to the microcantilever 114. A light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the PZT oscillator 108 is controlled by n function generators $FG_{is}$ (i=1, 2, 3, ... n) represented collectively by box 126 so that the PZT oscillator 108 vibrates the microcantilever at multiple vibrational energies having frequencies $f_{is}$ and amplitude $a_s$. The frequencies $f_{is}$ range from a few kHz to several tens of MHz. In order to read out the deflection of the microcantilever 214, the optical detection system is generally used as described previously. Motion of the tip 212 can also be detected by the piezoresistive method or the piezoelectric method described previously. Note that function generators $FG_{is}$ can be replaced by a single programmable function generator that can handle multifrequency waveforms.

As shown in FIG. 7, the PZT oscillator 116 is glued to the microcantilever 114. The PZT oscillator 116 is connected to n function generators $FG_{ip}$ (i=1, 2, 3, ... n) represented collectively by box 136 so that the PZT oscillator 116 generates multiple vibrational energies in the form of waves at multiple frequencies $f_{ip}$ and amplitude $a_p$. The frequencies $f_{ip}$ are generated independently of the frequencies The frequencies $f_{ip}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_{ip}$ can be replaced by a single programmable function generator that can handle multifrequency waveforms.

Couplings C, such as that described previously, are achieved by the sensor system 200. The couplings C are determined from the signals S(t), T(t) generated by detectors 122 and 222, respectively. The signals are sent to the controllers 138 and 238 to control the Z-position of the probes as part of a feedback loop. The signals are also sent to lock-in amplifiers 140 and 240 to monitor the contribution of nonlinear multi-order coupling resulting from the excitation of the microcantilever 114 and the microcantilever 214 brought in contact with one another. The signals are also sent to spectrum analyzer 145 and spectrum analyzer 245 to measure a spectrum of multi-order coupling associated with each cantilever. The lock-in amplifiers 140 and 240 monitor the contribution of a given component of the coupling (a C-mode) in the form of its amplitude and phase, and the information/signals can be sent to respective processors 141 and 241 for further analysis. The spectra determined by the spectrum analyzers 145 and 245 and the images determined by processors 141 and 241 can be displayed on displays 143 and 243.

Other analyses performed by the sensor system 200 are possible. For example, the system 200 can be operated using the AFM and data acquisition software such as Labview and a Signal Access Module (SAM from Veeco), which allow external signals to be sent back to the controllers 138, 238 to be displayed at displays 143, 243. The information provided through the AFM software includes maps of the contribution of a given frequency to the complex coupling between the microcantilever 114 and the microcantilever 214. This will include amplitude and phase measurements with respect to a given frequency to the complex coupling between the microcantilever 114 and the microcantilever 214. It can also include monitoring of the evolution of the amplitude and phase of the signal at a given frequency as a function of the position of the microcantilever 114 with respect to the position (X, Y, Z) of the microcantilever 214. The study of the deflection of the microcantilever 114 as a function of Z is used to study the mechanical properties of the molecules present between the tip 112 and 212. The general use of the sensor system 200 is as a sensitive multi frequency oscillator. Adsorption of small number of molecules will result in a series of shifts in the frequencies that can be monitored.

Figure 8:
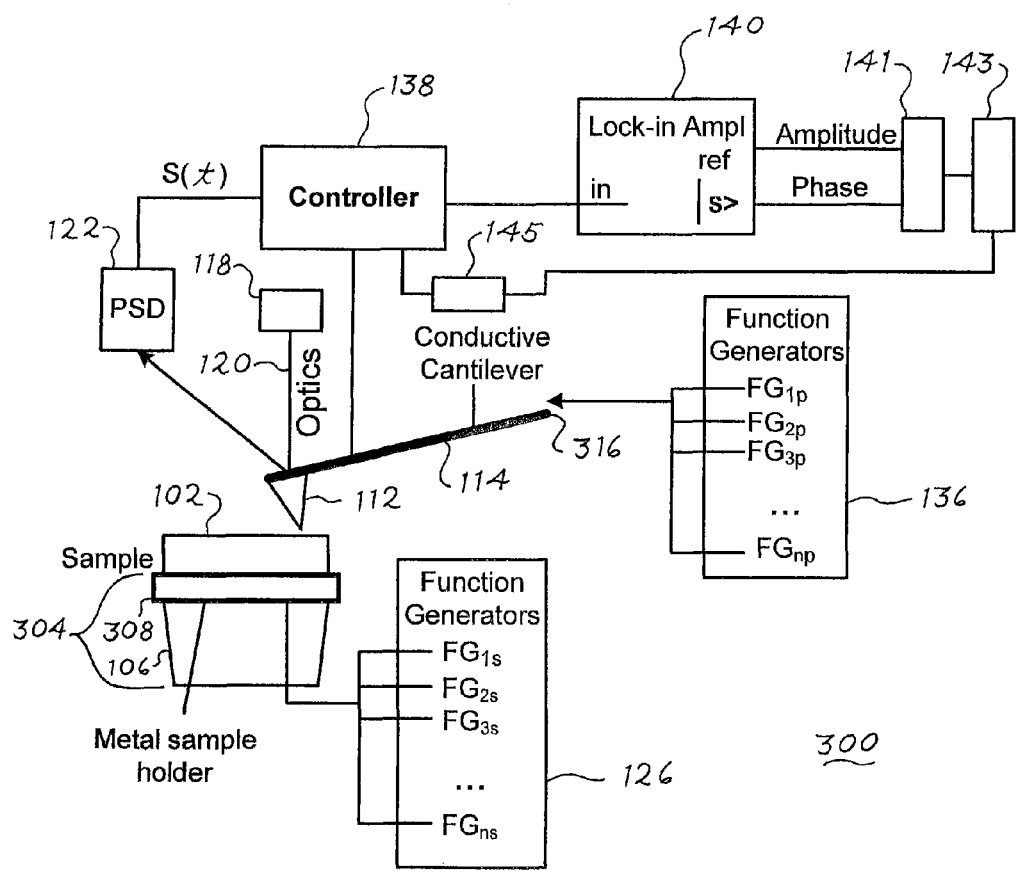
FIG. 8 schematically shows a third embodiment of an analysis system in accordance with the present invention.

Another analysis system is shown in FIG. 8. As shown in FIG. 8, analysis system 300 is a variation of analysis system 100, wherein PZT oscillators 108 and 116 have been removed and replaced with conductive materials, as explained below, in order to exploit the electrostatic forces of the system (instead of Van der Walls in 100 and 200 systems). In this embodiment, an organic or inorganic sample 102 is attached to a sample holder 304 capable of generating excitation electromagnetic energies applied to the sample 102 at a few kHz to several tens of MHz frequencies. The vibrations are generated by driving the electrically conductive layers 308 and 316 with varying the electric fields. The sample holder 304 includes a base 106 and an electrically conductive layer 308 that acts as a first excitation source. The position of the probe 112-114 with respect to the sample base 106 can be changed in the x-y direction (depending on the AFM system used, either the cantilever or the sample can be moved in x-y direction). The layer 308 is glued to the base 106 at a location that enables excitation of the sample 102 from the bottom of the sample 102, in order to access subsurface information. The layer 308 generates electric fields that oscillate in the range of a few kHz to tens of MHz, wherein the limit on its frequency is imposed by the bandwidth of the other pieces of equipment of the system 300.

As shown in FIG. 8, the sample 102 is in contact with a tip 112 of a microcantilever 114 of an atomic force microscope (AFM). The AFM can be a commercial product such as the Multimode system made by Veeco with a Nanoscope III controller (but it is not restricted to this model). As shown in FIG. 8, at least an end portion of the microcantilever 114 includes a second excitation source, such as an electrically conductive material 316, which can cause the microcantilever 114 to vibrate. The entire cantilever 114 is electrically conductive so that electrical force component is generated at the tip 112. A light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. Such deflection reflects the interaction between the sample 102 and the tip 112 and can include van der Waals-type and Coulomb-type contribution, wherein the Coulomb-type contribution may be dominant depending on the strength of the electric fields. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the electric fields caused by layer 308 are controlled by n function generators $FG_{is}$ (1=1, 2, 3, . . . n) represented collectively by box 126 so that the conductive sample holder 308 generates multiple electric fields at multiple frequencies $f_{is}$ and amplitude $a_s$. The electric fields have frequencies $f_{is}$ that range from a few kHz to several tens of MHz. The multi-mode interaction between the electric fields generated by the layer 308 and material 316 are sensed up by the microcantilever 114. Note that function generators $FG_{is}$ can be replaced by a single programmable function generator that can handle multifrequency waveforms.

As shown in FIG. 8, the electric fields generated by electrically conductive material 316 are controlled by n function generators $FG_{ip}$ (i=1, 2, 3, . . . n) represented collectively by box 136 so that the material 316 generates multiple electric field energies having electric fields with multiple frequencies $f_{ip}$ and amplitude $a_p$. The frequencies $f_{ip}$ are generated independently of the frequencies $f_{is}$. The frequencies $f_{ip}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_{ip}$ can be replaced by a single programmable function generator that can handle multifrequency waveforms.

A coupling C, such as that described previously, is achieved by the analysis system 300. The coupling C is determined from the signal S(t) generated by detector 122. The signal is sent to the controller 138 to control the Z-position of the probes as part of a feedback loop. The signal is also sent to a lock-in amplifier 140 to monitor the nonlinear multi-order coupling resulting from the excitation of the microcantilever 114 and the sample 102 brought in contact with one another. The signal is sent to a spectrum analyzer 145 as well to measure a spectrum of multi-order coupling in a manner similar to that done with analysis system 100. The lock-in amplifier 140 sends amplitude and phase information/signals to a processor 141 that determines an image of the sample 102 based on the signals in a manner similar as done in analysis system 100. The spectrum determined by spectrum analyzer 145 and the image of the sample 102 can be displayed on display 143.

Other analyses performed by the analysis system 300 are possible. For example, the system 300 can be operated using the AFM and data acquisition software such as Labview and a Signal Access Module (SAM from Veeco), which allow external signals to be sent back to the controller 138 to be displayed at display 143. The information provided through the AFM software are: 1) the topography of the sample and 2) the response of the sample to the electric field oscillations for each component (frequency) generated by the nonlinear coupling. The information provided through the data acquisition system software will include maps of the contribution of a given frequency to the complex coupling between the tip 112 of the microcantilever 114 and the sample 102. This will include amplitude and phase measurements with respect to a given frequency to the complex coupling between the tip 112 of the microcantilever 114 and the sample 102. It can also include monitoring of the evolution of the amplitude and phase of the signal at a given frequency as a function of the position of the microcantilever 114 with respect to position (X, Y, Z) of the sample 102 or as a function of time. The study of the deflection of the microcantilever 114 as a function of Z can also be used to study the mechanical properties of the sample 102.

Figure 9:
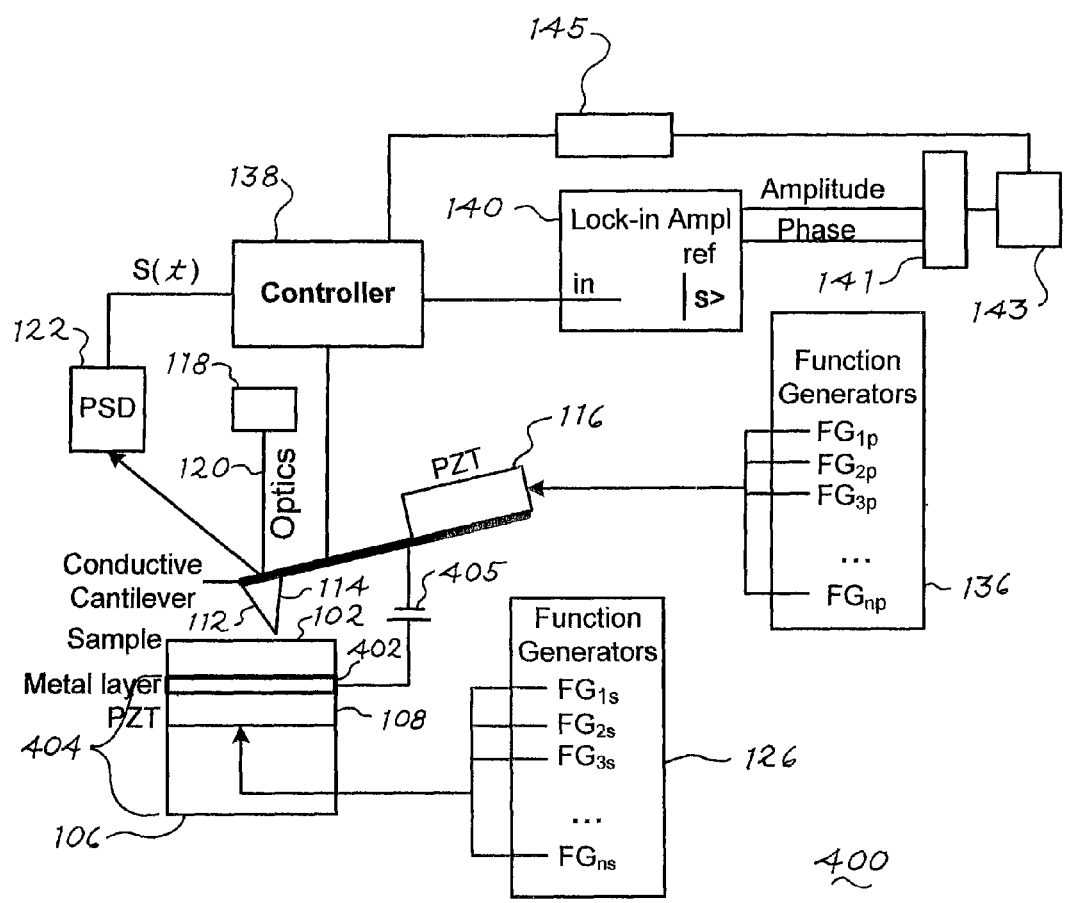
FIG. 9 schematically shows a fourth embodiment of an analysis system in accordance with the present invention.

Another analysis system is shown in FIG. 9. As shown in FIG. 9, analysis system 400 is a variation of analysis system 100, wherein a metal layer 402 is introduced between the organic or inorganic sample 102 and the PZT oscillator 108. In this embodiment, the sample 102 is attached to a piezoelectric sample holder 404 capable of vibrating the sample 102 at a few kHz to several tens of MHz frequencies. The sample holder 404 includes a base 106, a metal layer 402 and a first excitation source, such as a bimorph/piezoelectric crystal (PZT) oscillator 108. The position of the probe 112-114 with respect to the sample base 106 can be changed in the x-y direction (depending on the AFM system used, either the cantilever or the sample can be moved in x-y direction). The PZT oscillator 108 is glued to the base 106 at a location that enables excitation of the sample 102 from the bottom of the sample 102, in order to access subsurface information. The PZT oscillator 108 can generation vibrational energies having frequencies in the range of a few kHz to tens of MHz, wherein the limit on its frequency is imposed by the bandwidth of the other pieces of equipment of the system 400.

As shown in FIG. 9, the sample 102 is near, but not in contact with a tip 112 of a microcantilever 114 of an atomic force microscope (AFM). The AFM can be a commercial product such as the Multimode system made by Veeco with a Nanoscope III controller (but it is not restricted to this model). The microcantilever 114 is made of a conductive material and is biased along with metal layer 402 with a potential source, such as a power supply 405 to create a system where the electrostatic forces are predominant. As shown in FIG. 9, a second excitation source, such as a PZT oscillator 116, is coupled to the microcantilever 114. A light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the PZT oscillator 108 is controlled by n function generators $FG_{is}$ (i=1, 2, 3, . . . n) represented collectively by box 126 so that the PZT oscillator 108 generates multiple vibrational waves at multiple frequencies $f_{is}$ and amplitude $a_s$. The waves have frequencies $f_{is}$ that range from a few kHz to several tens of MHz. The waves travel through the sample 102 and are sensed up by the microcantilever 114. In addition, the mechanical oscillations caused by oscillators 108 and 116 induce a modulated electrostatic force that will lead to a nonlinear interaction between the sample 102 and microcantilever 114. The nonlinear interaction is composed of van der Waal-type and Coulomb-type contributions, wherein the Coulomb-type contribution will be dominate depending on the strength of the electric fields. The amplitude and phase of the wave at a given frequency are detected via the motion of the tip 112. Note that function generators $FG_{is}$ can be replaced by a single programmable function generator that can handle multifrequency waveforms.

As shown in FIG. 9, a second PZT oscillator 116 is glued to the microcantilever 114. The PZT oscillator 116 is connected to n function generators $FG_{ip}$ (i=1, 2, 3, . . . n) represented collectively by box 136 so that the PZT oscillator 116 generates multiple wave forms acoustic waves at multiple frequencies $f_{ip}$ and amplitude $a_p$. The frequencies $f_{ip}$ are generated independently of the frequencies $f_{is}$. The frequencies $f_{ip}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_{ip}$ can be replaced by a single programmable function generator that can handle multifrequency waveforms.

A coupling C, such as that described previously, is achieved by the analysis system 400. The coupling C is determined from the signal S(t) generated by detector 122. The signal is sent to the controller 138 monitors the feedback loop that controls the Z-position of the cantilever and converts the signal S(t) into display of a 2D image. The signal is sent to a spectrum analyzer 145 to identify the spectrum of frequencies representative of the multi-order coupling in the Fourier space. The signal is sent to a lock-in amplifier 140 as well to monitor the amplitude and phase of a given component of the S(ω) (i.e. one of the peaks observed on the spectrum analyzer). The lock-in amplifier 140 sends amplitude and phase information/signals to a processor 141 (generally the processor is included in the controller 138) that determines an image of the sample 102 corresponding the the response of the system at the given frequency used as reference in the lock-in. The spectrum determined by spectrum analyzer 145 and the image of the sample 102 determined by processor 141 can be displayed on display 143.

Other analyses performed by the analysis system 400 are possible. For example, the system 400 can be operated using the AFM and data acquisition software such as Labview, and a Signal Access Module (SAM from Veeco), which allow external signals to be sent back to the controller 138 to be displayed at display 143. The information provided through the AFM software are: 1) the topography of the sample and 2) the response of the sample to the electric field oscillations for each component (frequency) generated by the nonlinear coupling and associated to the electrostatic properties of the sample. The information provided through the data acquisition system software will include maps of the contribution of a given frequency to the complex coupling between the tip 112 of the microcantilever 114 and the sample 102. This will include amplitude and phase measurements with respect to the C-modes over the (driving) frequency ranges and (driving) amplitudes ranges. It can also include monitoring of the evolution of the amplitude and phase of the signal at a given frequency as a function of the position of the microcantilever 114 with respect to position (X, Y, Z) of the sample 102 or with respect to time. The study of the deflection of the microcantilever 114 as a function of Z is used to study the mechanical properties of the sample 102.

Figure 10:
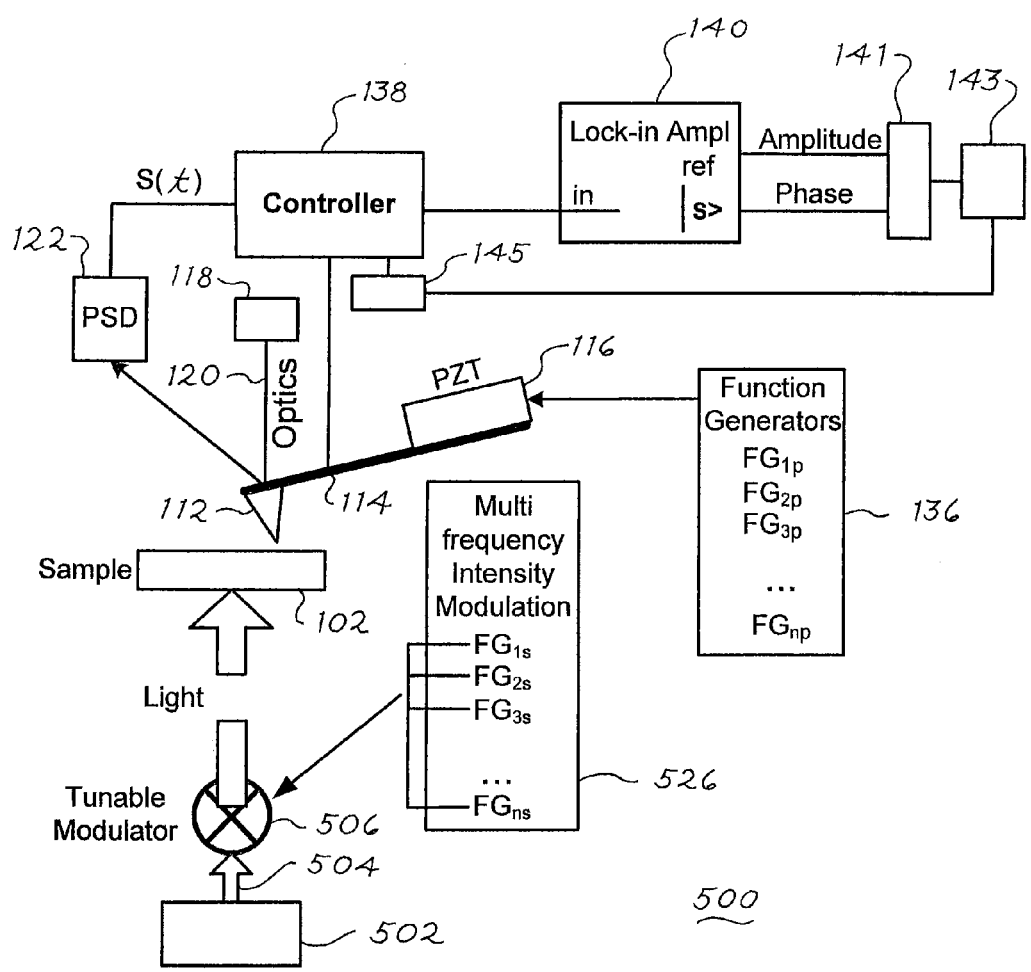
FIG. 10 schematically shows a fifth embodiment of an analysis system in accordance with the present invention.

Another analysis system is shown in FIG. 10. As shown in FIG. 10, analysis system 500 is a variation of analysis system 100, wherein the organic or inorganic sample 102 is thermally and mechanically excited by a first excitation source, such as light source 502, instead of by PZT oscillator 108. In this embodiment, the light source 502 can be a laser or a spectrometer light source, wherein it can emit either a beam of light with a fixed frequency or a beam of light composed of multiple wavelengths. The beam of light 504 emitted by the light source 502 is modulated by a tunable modulator 506. The tunable modulator 506 can be a mechanical chopper when kHz frequency light is emitted by light source 502. The tunable modulator 506 can be an acousto-optic modulator or pulsed laser when higher frequencies of light are emitted by light source 502. The chopper is used in order to perform lock-in measurements (necessary for low level noisy signals), and to limit the heating of the sample.

As shown in FIG. 10, the sample 102 is in contact with a tip 112 of a microcantilever 114 of an atomic force microscope (AFM). The AFM can be a commercial product such as the Multimode system made by Veeco with a Nanoscope III controller (but it is not restricted to this model). As shown in FIG. 10, a second excitation source, such as a PZT oscillator 116, is coupled to the microcantilever 114. A light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the tunable modulator 506 is controlled by n function generators $FG_{is}$ (i=1, 2, 3, . . . n) represented collectively by box 526 so that the light source 502 generates multiple waves at multiple frequencies $f_{is}$ and intensities $I_{is}$. The waves have frequencies $f_{is}$ that range from a few kHz to several tens of MHz depending on the thermal and optical properties. The waves travel through the sample 102 and generate oscillations via the heat generated that are sensed up by the microcantilever 114. In addition, the mechanical oscillations caused by the light source 502 and oscillator 116 create a nonlinear interaction between the sample 102 and microcantilever 114. The amplitude and phase of a wave at a given frequency are detected via the motion of the tip 112. Note that function generators $FG_{is}$ can be replaced by a single programmable function generator that can handle multifrequency waveforms.

As shown in FIG. 10, PZT oscillator 116 is glued to the microcantilever 114. The PZT oscillator 116 is connected to n function generators $FG_{ip}$ (i=1, 2, 3, . . . n) represented collectively by box 136 so that the PZT oscillator 116 generates multiple wave forms acoustic waves at multiple frequencies $f_{ip}$ and amplitude $a_p$. The frequencies $f_{ip}$ are generated independently of the frequencies $f_{is}$. The frequencies $f_{ip}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_{ip}$ can be replaced by a single programmable function generator that can handle multifrequency waveforms.

A coupling C, such as that described previously, is achieved by the analysis system 500. The coupling C is determined from the signal S(t) generated by detector 122. The controller 138 monitors the feedback loop that controls the Z-position of the cantilever and converts the signal S(t) into display of a 2D image. The signal is sent to a spectrum analyzer 145 to identify the spectrum of frequencies representative of the multi-order coupling in the Fourier space. The signal is sent to a lock-in amplifier 140 as well to monitor the amplitude and phase a given component of the S(ω) (i.e. one of the peaks observed on the spectrum analyzer), relative to the nonlinear multi-order coupling resulting from the excitation of the microcantilever 114 and the sample 102 brought in contact with one another. The lock-in amplifier 140 sends amplitude and phase information/signals to a processor 141 (generally the processor is included in the controller 138) that determines an image of the sample 102 corresponding the the response of the system at the given frequency used as reference in the lock-in. The spectrum determined by spectrum analyzer 145 and the image of the sample 102 determined by processor 141 can be displayed on display 143.

Other analyses performed by the analysis system 500 are possible. For example, the system 500 can be operated using the AFM and data acquisition software such as Labview, and a Signal Access Module (SAM from Veeco), which allow external signals to be sent back to the controller 138 to be displayed at display 143. The information provided through the AFM software are: 1) the topography of the sample, and 2) the response of the sample to the mechanical oscillations for each component (frequency) enhanced by the nonlinear coupling to the light excitation. The information provided through the data acquisition system software will include maps of the contribution of a given frequency to the complex coupling between the tip 112 of the microcantilever 114 and the sample 102. This will include amplitude and phase measurements with respect to the C-modes over the (driving) frequency ranges and (driving) amplitudes ranges. It can also include monitoring of the evolution of the amplitude and phase of the signal at a given frequency as a function of the position of the microcantilever 114 with respect to position (X, Y, Z) of the sample 102 or with respect to time. The study of the deflection of the microcantilever 114 as a function of Z is used to study the mechanical properties of the sample 102. The analysis system 500 will provide chemical information on the composition of the sample as a result of the sensitivity of the C-modes to temperature changes and physical properties changes in the material exposed to the light. The system 500 can be used to map the response of the sample illuminated with a fixed wavelength or a obtained a full spectrum of the material at the position where the tip is located.

Figure 11:
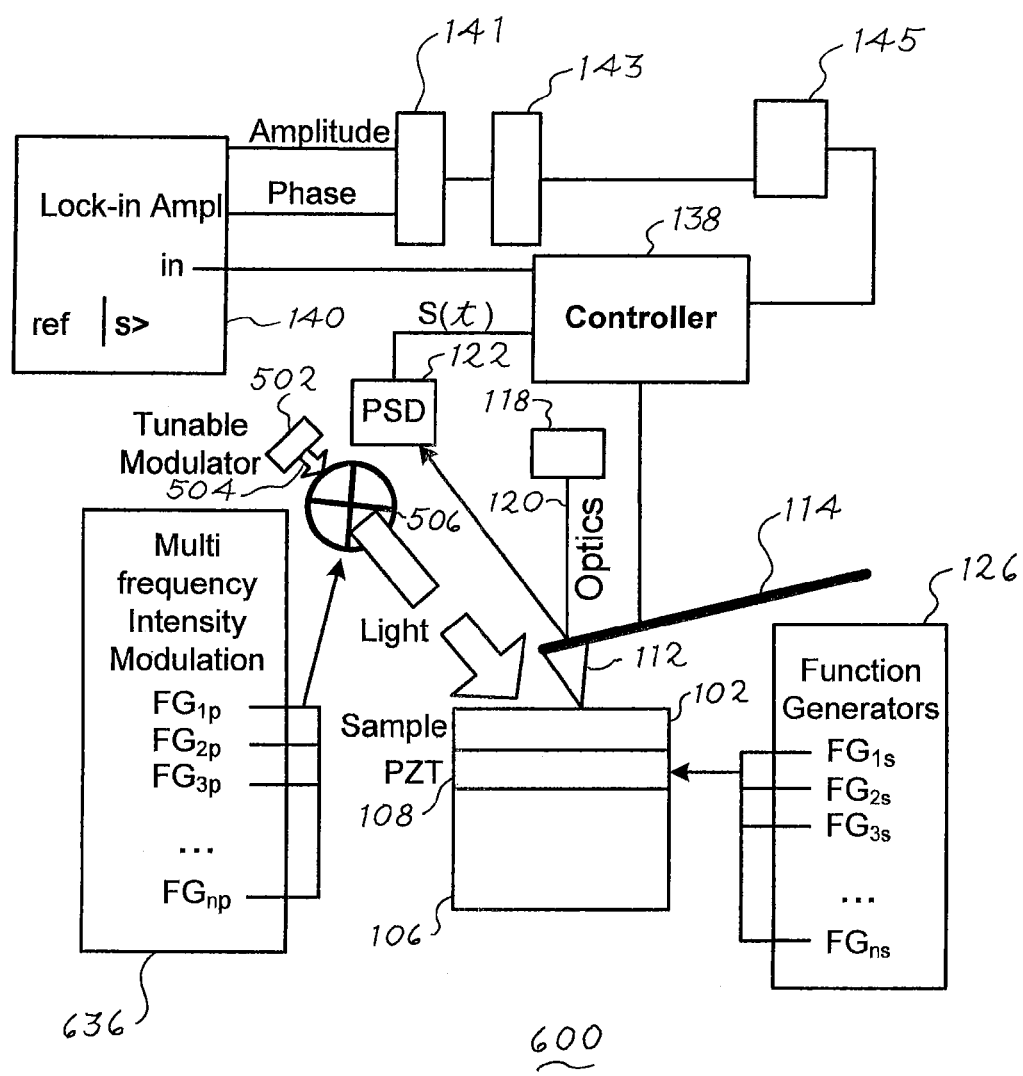
FIG. 11 schematically shows a sixth embodiment of an analysis system in accordance with the present invention.

Another analysis system is shown in FIG. 11. As shown in FIG. 11, analysis system 600 is a variation of analysis system 500, wherein the organic or inorganic sample 102 is thermally excited by a first excitation source, such as light source 502, and mechanically excited by a second excitation source, such as PZT oscillator 108. In this embodiment, the light source 502 can be a laser or a spectrometer light source, wherein it can emit either a beam of light with a fixed frequency or a beam of light composed of multiple wavelengths. The beam of light 504 emitted by the light source 502 is modulated by a tunable modulator 506 and is directed to the top surface of the sample 102. The tunable modulator 506 can be a mechanical chopper when kHz frequency light is emitted by light source 502. The tunable modulator 506 can be an acousto-optic modulator or pulsed laser when higher frequencies of light are emitted by light source 502. The chopper is used in order to perform lock-in measurements (necessary for low level noisy signals), and to limit the heating of the sample.

As shown in FIG. 11, the sample 102 is in contact with a tip 112 of a microcantilever 114 of an atomic force microscope (AFM). The AFM can be a commercial product such as the Multimode system made by Veeco with a Nanoscope III controller (but it is not restricted to this model). As shown in FIG. 11, PZT oscillator 108 is coupled to the bottom surface of the sample 102. The oscillations generated by the light source 502 and the PZT oscillator 108 are detected by the tip 112 of the microcantilever 114. A second light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the tunable modulator 506 is controlled by n function generators $FG_{ip}$ (i=1, 2, 3, . . . n) represented collectively by box 636 so that the light source 502 generates multiple waves at multiple frequencies $f_{ip}$, and intensities $I_{ip}$. The function generators 636 are similar to function generators 526 of FIG. 10. The waves have frequencies $f_{ip}$ that range from a few kHz to several tens of MHz depending on the thermal and optical properties. The waves interact with the sample 102 so as to generate oscillations via the heat generated that are sensed up by the microcantilever 114. Note that function generators $FG_{ip}$ can be replaced by a single programmable function generator that can handle multifrequency waveforms.

As shown in FIG. 11, PZT oscillator 108 is connected to n function generators $FG_{is}$ (i=1, 2, 3, ... n) represented collectively by box 126 so that the PZT oscillator 108 generates multiple vibrational energies in the way of waves having multiple frequencies $f_{ip}$ and amplitude $a_p$. The frequencies $f_{is}$ are generated independently of the frequencies $f_{ip}$. The frequencies $f_{is}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_{is}$ can be replaced by a single programmable function generator that can handle multifrequency waveforms.

A coupling C, such as that described previously, is achieved by the analysis system 600. The coupling C is determined from the signal S(t) generated by detector 122. The controller 138 monitors the feedback loop that controls the Z-position of the cantilever and converts the signal S(t) into display of a 2D image. The signal is sent to a spectrum analyzer 145 to identify the spectrum of frequencies representative of the multi-order coupling in the Fourier space. The signal is sent to a lock-in amplifier 140 as well to monitor the amplitude and phase a given component of the S($\omega$) (i.e. one of the peaks observed on the spectrum analyzer), relative to the nonlinear multi-order coupling resulting from the excitation of the microcantilever 114 and the sample 102 brought in contact with one another. The lock-in amplifier 140 sends amplitude and phase information/signals to a processor 141 (generally the processor is included in the controller 138) that determines an image of the sample 102 corresponding the the response of the system at the given frequency used as reference in the lock-in. The spectrum determined by spectrum analyzer 145 and the image of the sample 102 determined by processor 141 can be displayed on display 143.

Other analyses performed by the analysis system 600 are possible. For example, the system 600 can be operated using the AFM and data acquisition software such as Labview, and a Signal Access Module (SAM from Veeco), which allow external signals to be sent back to the controller 138 to be displayed at display 143. The information provided through the AFM software are: 1) the topography of the sample, and 2) the response of the sample to the mechanical oscillations for each component (frequency) enhanced by the nonlinear coupling to the light excitation. The information provided through the data acquisition system software will include maps of the contribution of a given frequency to the complex coupling between the tip 112 of the microcantilever 114 and the sample 102. This will include amplitude and phase measurements with respect to the C-modes over the (driving) frequency ranges and (driving) amplitudes ranges. It can also include monitoring of the evolution of the amplitude and phase of the signal at a given frequency as a function of the position of the microcantilever 114 with respect to position (X, Y, Z) of the sample 102 or with respect to time. The study of the deflection of the microcantilever 114 as a function of Z is used to study the mechanical properties of the sample 102. The analysis system 600 will provide chemical information on the composition of the sample as a result of the sensitivity of the C-modes to temperature changes and physical properties changes in the material exposed to the light. The system 600 can be used to map the response of the sample illuminated with a fixed wavelength or a obtained a full spectrum of the material at the position where the tip is located.

Figure 12:
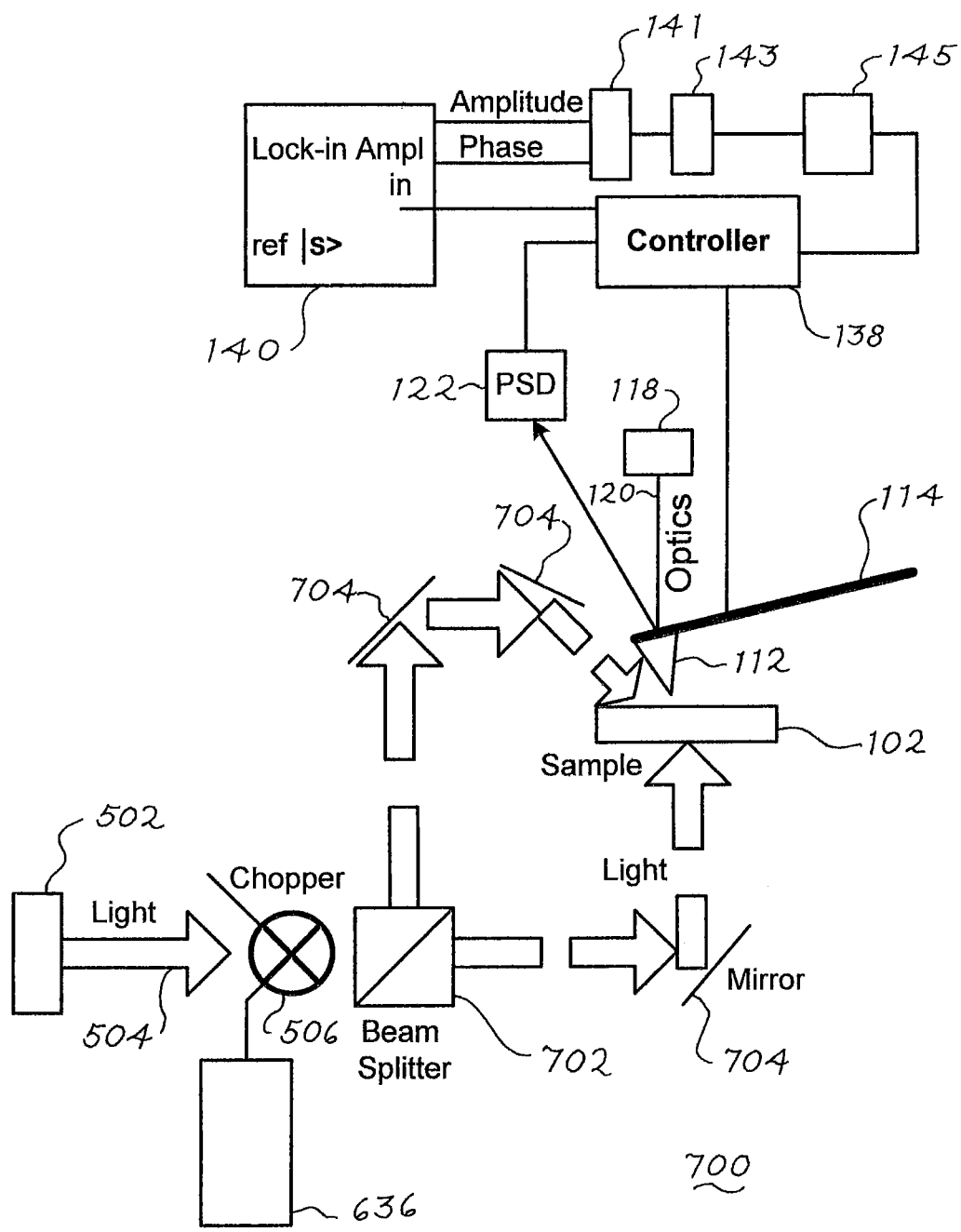
FIG. 12 schematically shows a seventh embodiment of an analysis system in accordance with the present invention.

Another analysis system is shown in FIG. 12. As shown in FIG. 12, analysis system 700 is a variation of analysis systems 500 and 600, wherein the organic or inorganic sample 102 is thermally excited both at its top and bottom surfaces by an excitation source, such as light source 502. In this embodiment, the light source 502 can be a laser or a spectrometer light source, wherein it can emit either a beam of light with a fixed frequency or a beam of light composed of multiple wavelengths. The beam of light 504 emitted by the light source 502 is modulated by a tunable modulator 506. The modulated light is directed to the bottom and top surfaces of the sample 102 by a beam splitter 702 and optics, such as a plurality of mirrors 704. Accordingly, each split beam acts as a separate excitation source. The coherence (and phase difference) between modulated light sent to the top and bottom surfaces of the sample 102 is used appropriately. The tunable modulator 506 can be a mechanical chopper when kHz frequency light is emitted by light source 502. The tunable modulator 506 can be an acousto-optic modulator or pulsed laser when higher frequencies of light are emitted by light source 502. The chopper is used in order to perform lock-in measurements (necessary for low level noisy signals), and to limit the heating of the sample.

As shown in FIG. 12, the sample 102 is in contact with a tip 112 of a microcantilever 114 of an atomic force microscope (AFM). The AFM can be a commercial product such as the Multimode system made by Veeco with a Nanoscope III controller (but it is not restricted to this model). The oscillations generated by the light striking the bottom and top surfaces of the sample 102 are detected by the tip 112 of the microcantilever 114. A second light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the tunable modulator 506 is controlled by n function generators $FG_i$ (i=1, 2, 3, ... n) represented collectively by box 636 so that the light source 502 generates multiple waves at multiple frequencies $f_{is}$ and intensities $I_{ip}$. The light beams create excitation energies having frequencies $f_i$ that range from a few kHz to several tens of MHz depending on the thermal and optical properties. The waves interact with the sample 102 so as to generate oscillations via the heat generated that are sensed up by the microcantilever 114. Note that function generators $FG_i$ can be replaced by a single programmable function generator that can handle multifrequency waveforms.

A coupling C, such as that described previously, is achieved by the analysis system 700. The coupling C is determined from the signal S(t) generated by detector 122. The controller 138 monitors the feedback loop that controls the Z-position of the cantilever and converts the signal S(t) into display of a 2D image. The signal is sent to a spectrum analyzer 145 to identify the spectrum of frequencies representative of the multi-order coupling in the Fourier space. The signal is sent to a lock-in amplifier 140 as well to monitor the amplitude and phase a given component of the S($\omega$) (i.e. one of the peaks observed on the spectrum analyzer), relative to the nonlinear multi-order coupling resulting from the excitation of the microcantilever 114 and the sample 102 brought in contact with one another. The lock-in amplifier 140 sends amplitude and phase information/signals to a processor 141 (generally the processor is included in the controller 138) that determines an image of the sample 102 corresponding the the response of the system at the given frequency used as reference in the lock-in. The spectrum determined by spectrum analyzer 145 and the image of the sample 102 determined by processor 141 can be displayed on display 143.

Other analyses performed by the analysis system 700 are possible. For example, the system 700 can be operated using the AFM and data acquisition software such as Labview, and a Signal Access Module (SAM from Veeco), which allow external signals to be sent back to the controller 138 to be displayed at display 143. The information provided through the AFM software are: 1) the topography of the sample, and 2) the response of the sample to the mechanical oscillations for each component (frequency) enhanced by the nonlinear coupling to the light excitation. The information provided through the data acquisition system software will include maps of the contribution of a given frequency to the complex coupling between the tip 112 of the microcantilever 114 and the sample 102. This will include amplitude and phase measurements with respect to the C-modes over the (driving) frequency ranges and (driving) amplitudes ranges. It can also include monitoring of the evolution of the amplitude and phase of the signal at a given frequency as a function of the position of the microcantilever 114 with respect to position (X, Y, Z) of the sample 102 or with respect to time. The study of the deflection of the microcantilever 114 as a function of Z is used to study the mechanical properties of the sample 102. The analysis system 700 will provide chemical information on the composition of the sample as a result of the sensitivity of the C-modes to temperature changes and physical properties changes in the material exposed to the light. The system 700 can be used to map the response of the sample illuminated with a fixed wavelength or a obtained a full spectrum of the material at the position where the tip is located.

Figure 13:
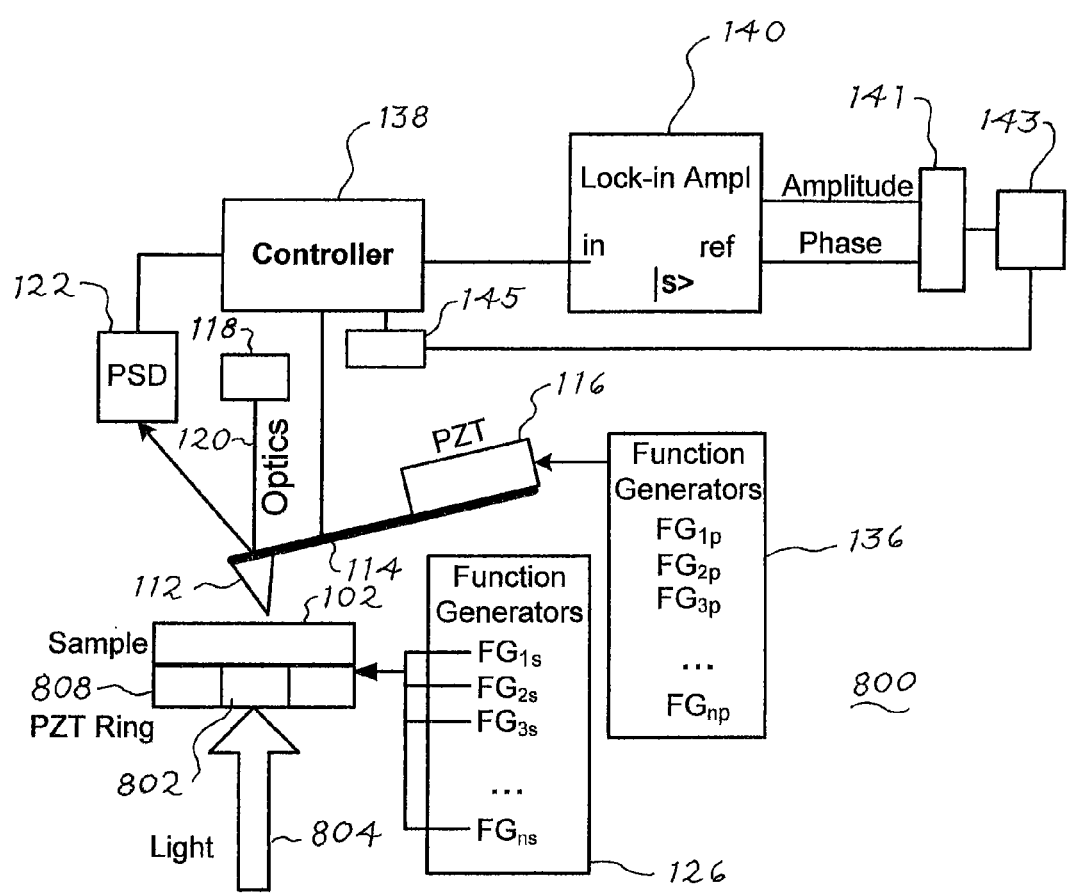
FIG. 13 schematically shows an eighth embodiment of an analysis system in accordance with the present invention.

An analysis system 800 is shown in FIG. 13. In this embodiment, the inorganic or organic sample 102 is attached to a first excitation source, such as a bimorph/piezoelectric crystal (PZT) oscillator 808. The PZT oscillator 108 enables vibrational excitation of the sample 102 from the bottom of the sample 102, in order to access subsurface information. The PZT oscillator 108 can be in the range of a few kHz to tens of MHz, wherein the limit on its frequency is imposed by the bandwidth of the other pieces of equipment of the system 800. The oscillator 808 can have an opening 802 that receives light 804 therethrough so that the sample 102 is heated. Although the coupling is generated by the mechanical excitation of the probe and the sample in contact, the illumination of the sample by a light source 804 will affect the amplitude and the phase of the coupling. This analysis system can be configured with or without the chopper described in FIG. 11.

As shown in FIG. 13, the sample 102 is in contact with a tip 112 of a microcantilever 114 of an atomic force microscope (AFM). The AFM can be a commercial product such as the Multimode system made by Veeco with a Nanoscope III controller (but it is not restricted to this model). As shown in FIG. 13, a second excitation source, such as a PZT oscillator 116, is coupled to the microcantilever 114. A light source, such as laser diode 118, generates a beam 120 of light that is directed toward the microcantilever 114 and is reflected toward a detector, such as a four-quadrant photodetector 122. The reflected beam contains information regarding the deflection undergone by the microcantilever 114. A mirror or other optical elements may direct the reflected light toward the photodetector 122. Besides the above described optical deflection system, it would be possible to use a piezoresistive or piezoelectric method, in which case the microcantilever 114 would be of different composition.

In operation, the PZT oscillator 108 is controlled by n function generators $FG_{i_s}$ (i=1, 2, 3, . . . n) represented collectively by box 126 so that the PZT oscillator 808 generates multiple vibrational energies in the form of waves at multiple frequencies $f_{i_s}$ and amplitude $a_s$. The waves have frequencies $f_{i_s}$ that range from a few kHz to several tens of MHz. The waves travel through the sample 102 and are sensed by the microcantilever 114. The amplitude and phase of a wave at a given frequency are detected via the motion of the tip 112. Note that function generators $FG_{i_s}$ can be replaced by a single programmable function generator that can handle multifrequency waveforms.

As shown in FIG. 13, the PZT oscillator 116 is glued to the microcantilever 114. The PZT oscillator 116 is connected to n function generators $FG_{i_p}$ (i=1, 2, 3, . . . n) represented collectively by box 136 so that the PZT oscillator 116 generates multiple vibrational energies in the form of waves at multiple frequencies $f_{i_p}$ and amplitude $a_p$. The frequencies $f_{i_p}$ are generated independently of the frequencies $f_{i_s}$. The frequencies $f_{i_p}$ range from a few kHz to several tens of MHz. In order to read out the deflection of the microcantilever 114, the optical detection system is generally used as described previously. Motion of the tip 112 can also be detected by the piezoresistive method or the piezoelectric method described previously. Note that function generators $FG_{i_p}$ can be replaced by a single programmable function generator that can handle multifrequency waveforms.

A coupling C, such as that described previously, is achieved by the analysis system 800. The coupling C is determined from the signal S(t) generated by detector 122. The controller 138 monitors the feedback loop that controls the Z-position of the cantilever and converts the signal S(t) into display of a 2D image. The signal is sent to a spectrum analyzer 145 to identify the spectrum of frequencies representative of the multi-order coupling in the Fourier space. The signal is sent to a lock-in amplifier 140 as well to monitor the amplitude and phase a given component of the S(ω) (i.e. one of the peaks observed on the spectrum analyzer), relative to the nonlinear multi-order coupling resulting from the excitation of the microcantilever 114 and the sample 102 brought in contact with one another. The lock-in amplifier 140 sends amplitude and phase information/signals to a processor 141 (generally the processor is included in the controller 138) that determines an image of the sample 102 corresponding the the response of the system at the given frequency used as reference in the lock-in. The spectrum determined by spectrum analyzer 145 and the image of the sample 102 determined by processor 141 can be displayed on display 143.

Other analyses performed by the analysis system 800 are possible. For example, the system 800 can be operated using the AFM and data acquisition software such as Labview, and a Signal Access Module (SAM from Veeco), which allow external signals to be sent back to the controller 138 to be displayed at display 143. The information provided through the AFM software is: 1) the topography of the sample, 2) the response of the sample to the mechanical oscillations for each component (frequency) generated by the nonlinear coupling. The information provided through the data acquisition system software will include maps of the contribution of a given frequency to the complex coupling between the tip 112 of the microcantilever 114 and the sample 102. This will include amplitude and phase measurements with respect to the C-modes over the (driving) frequency ranges and (driving) amplitudes ranges. It can also include monitoring of the evolution of the amplitude and phase of the signal at a given frequency as a function of the position of the microcantilever 114 with respect to position (X, Y, Z) of the sample 102 or with respect to time. The study of the deflection of the microcantilever 114 as a function of Z is commonly called a "force curve measurement" and is used to study the mechanical properties of the sample 102.

With the above described MSAFM systems of FIGS. 1-13, various information regarding the samples can be ascertained. For example, when "vibrational excitation" of the sample occurs, information regarding the mechanical/physical properties can be obtained. When "electromagnetic excitation" of the sample occurs, electric/physical properties of the sample can be obtained and chemical information is obtained when light is shone on the sample. In addition, various imaging information can be generated, such as 1) subsurface scattering and imaging, 2) imaging of nanofabricated samples, 3) imaging of biomass samples, as will be described below 4) chemical information.

Subsurface Scattering and Imaging Using MSAFM

Figure 14A:
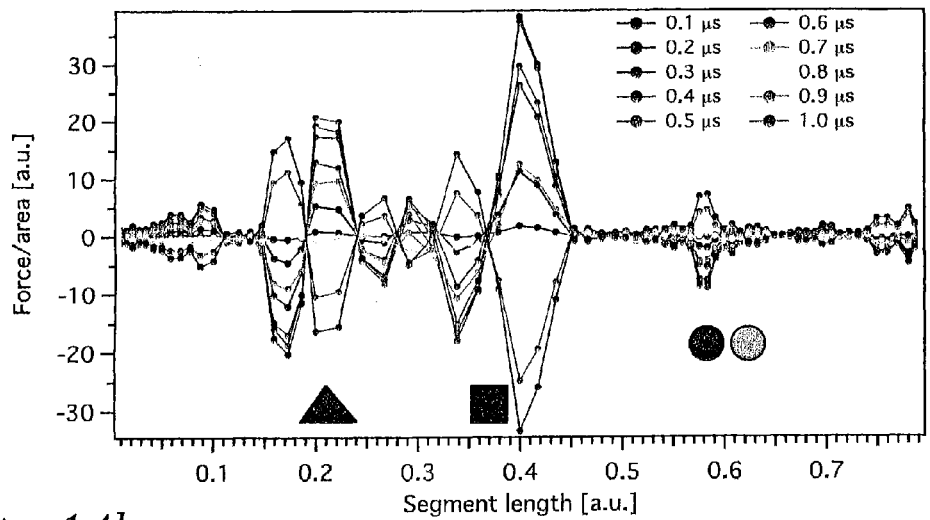
FIG. 14A shows a plot of surface traction of a sample with nanoparticle inhomogeneities.
Figure 14B:
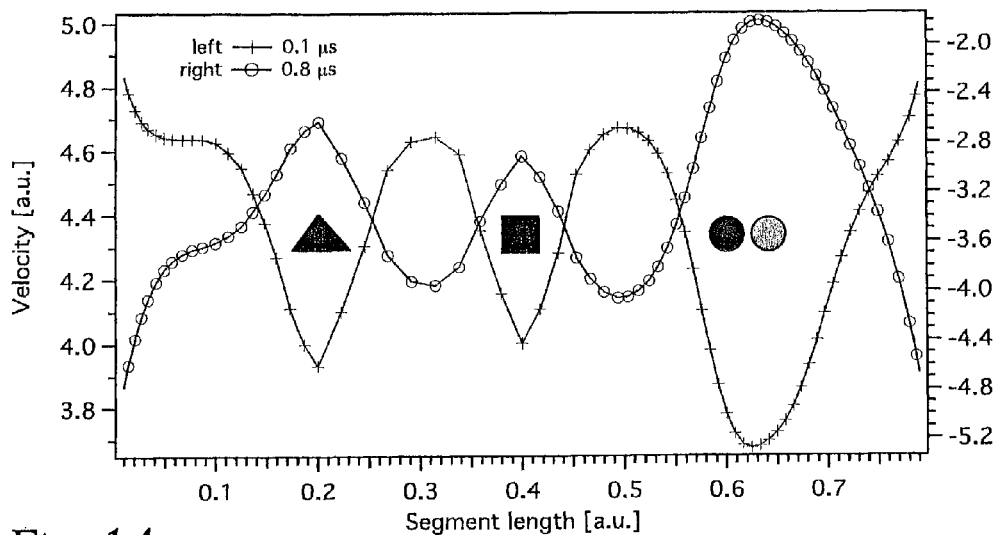
FIG. 14B shows a plot of surface velocity of a sample with nanoparticle inhomogeneities.
Figure 14C:
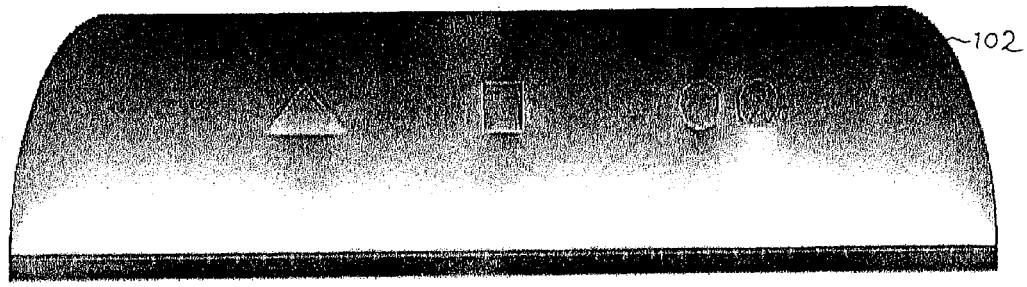
FIG. 14C shows the sample from which the plots of FIGS. 14A-B are derived.

MSAFM relies on the C-modes to acquire subsurface information. Using elastic excitation and therefore initially an "acoustic probe" to sense the interior of the sample 102, the variation in the C-modes will then register the embedded inhomogeneities. In a hypothetical gedanken measurement scenario, in principle, using a sample's C-modes, one could measure the presence of any nanoparticles within the material domain of the cantilever probe via the detection of an induced perturbation. However, in this gedanken experiment, one would need to be able to detect the local oscillation of the sample surface, near the contact point, with a comparable sensitivity to that of the cantilever. In an attempt to computationally visualize the subsurface elastic perturbation induced by embedded nanoparticles that would give rise to a detectable surface manifestation, altering the contact point dynamics (and thus altering the C-modes attributes), the surface stress, surface velocity, deformation, and strain energy density of a cell-shaped silicon medium that has various shaped embedded nanomaterial inhomogeneities can be solved. The results are shown in FIGS. 14*a-c* and clearly indicate that the embedded structures (triangle, square, and circles of different materials) can engender, at the top surface of the embedding structure, a variation in the surface traction and the velocity. The right most particle has a Young modulus that is higher than the silicon matrix, while all the others have lower moduli. Note that FIG. 14*a* is a calculation of surface traction, FIG. 14*b* is a calculation of surface velocity measured at a segment of the top boundary of the surface shown in FIG. 14*c*. Also, the sample 102 of FIG. 14*c* containing the nanoparticles of three different geometries is elastically excited from the bottom layer. FIG. 14*c* is a black and white picture of a colored picture representing the strain energy density, and the particular color of the boundary of the sample and the nanoparticles indicate the total displacement of the material. A brighter surface color indicates a higher strain energy density due to its vicinity to the oscillating boundary (substrate interface). A red boundary color for the embedded nanoparticles indicates a higher total displacement of the nanoparticles while a yellow color indicates a smaller displacement.

Imaging of Nanofabricated Samples Using MSAFM

Figure 15A:
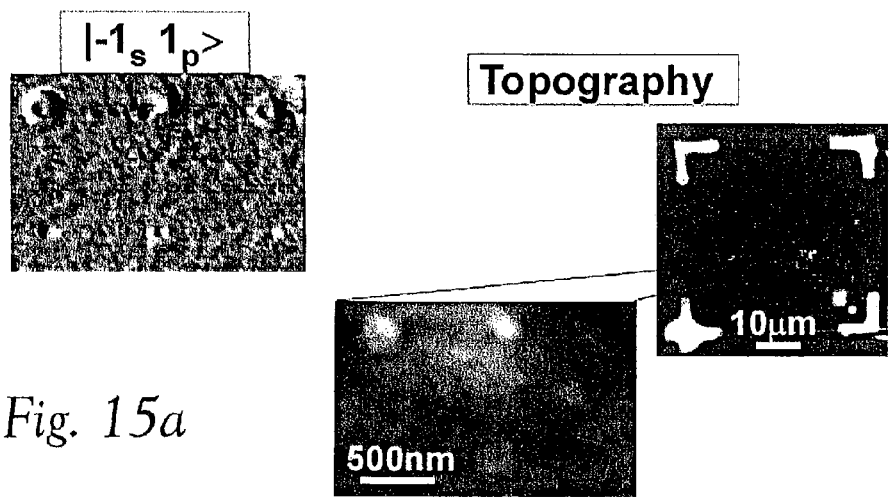
FIGS. 15a-h show MSAFM images of a sample with nanostructures formed thereon using the system of FIG. 3.
Figure 15B:
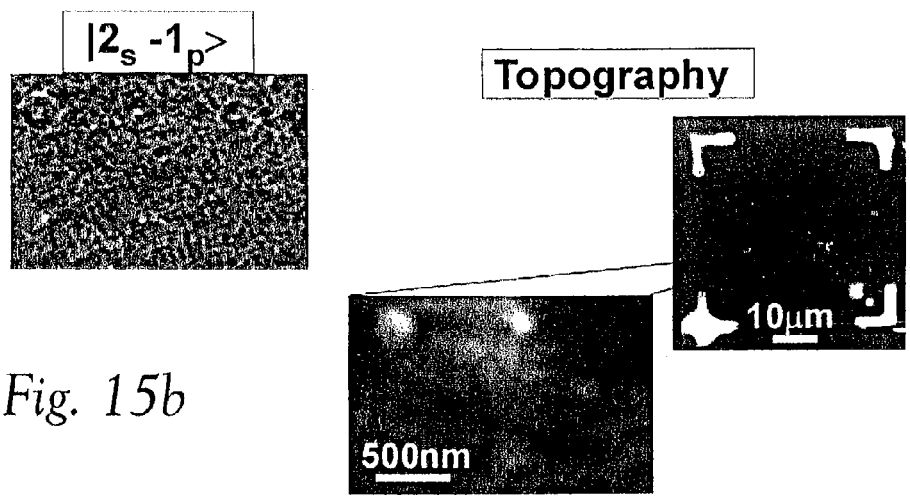
Figure 15C:
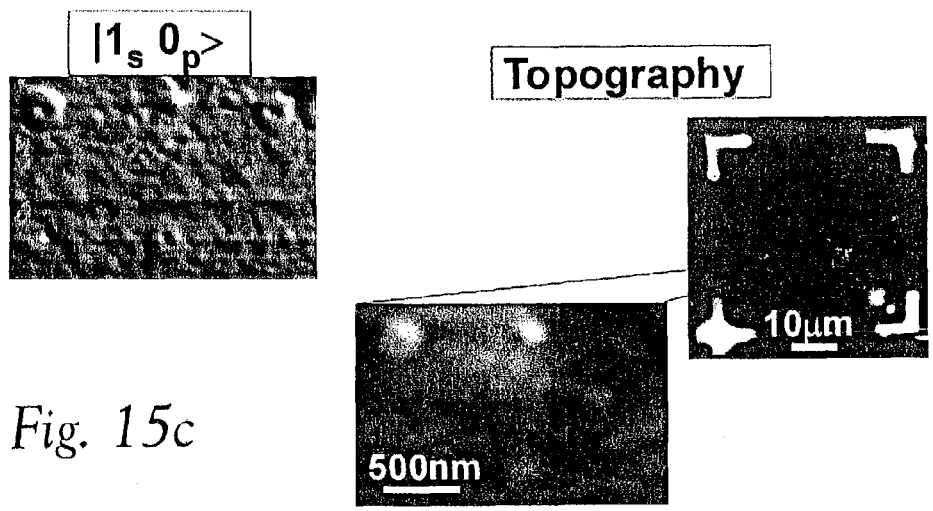
Figure 15D:
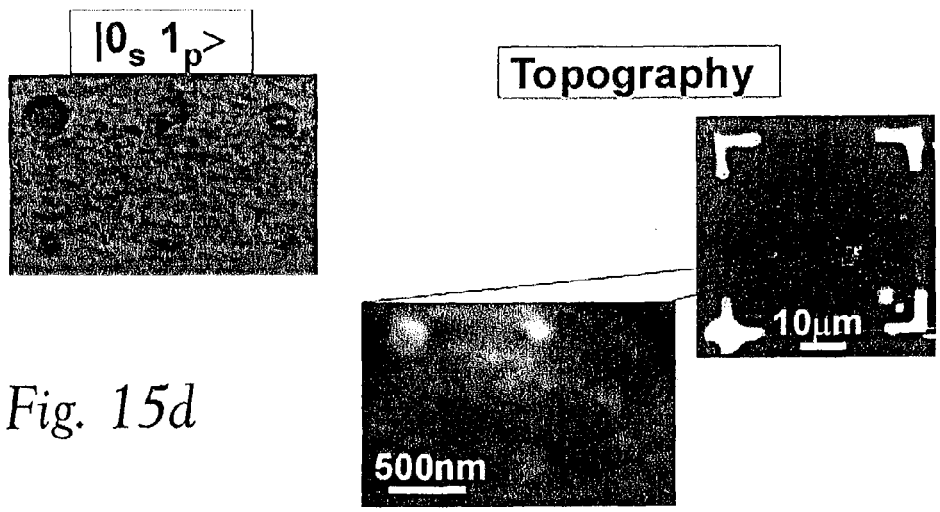
Figure 15E:
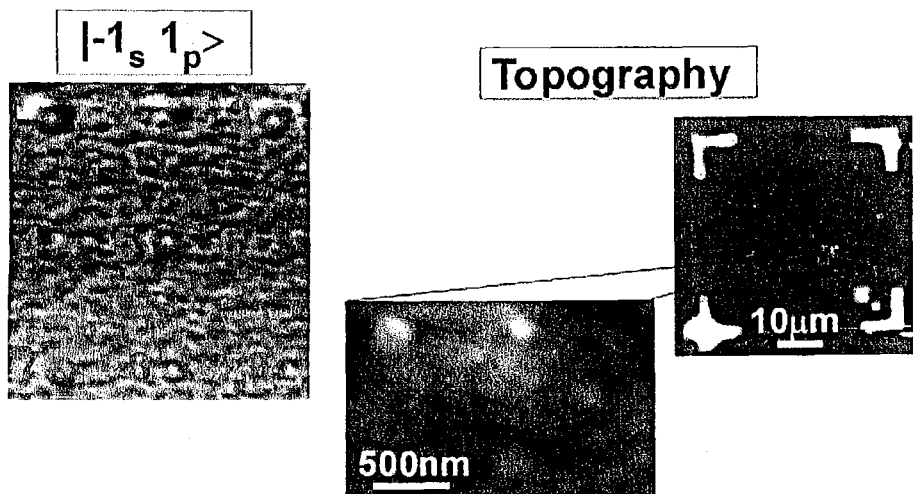
Figure 15F:
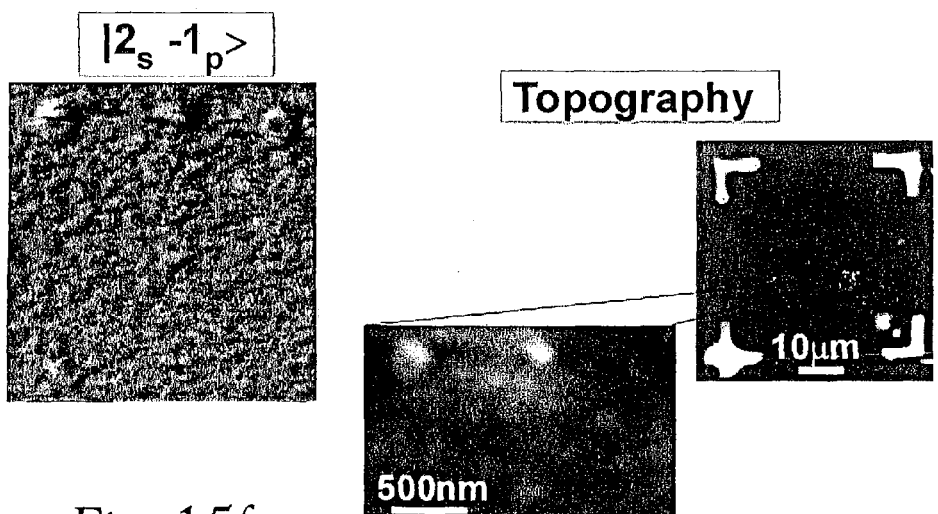
Figure 15G:
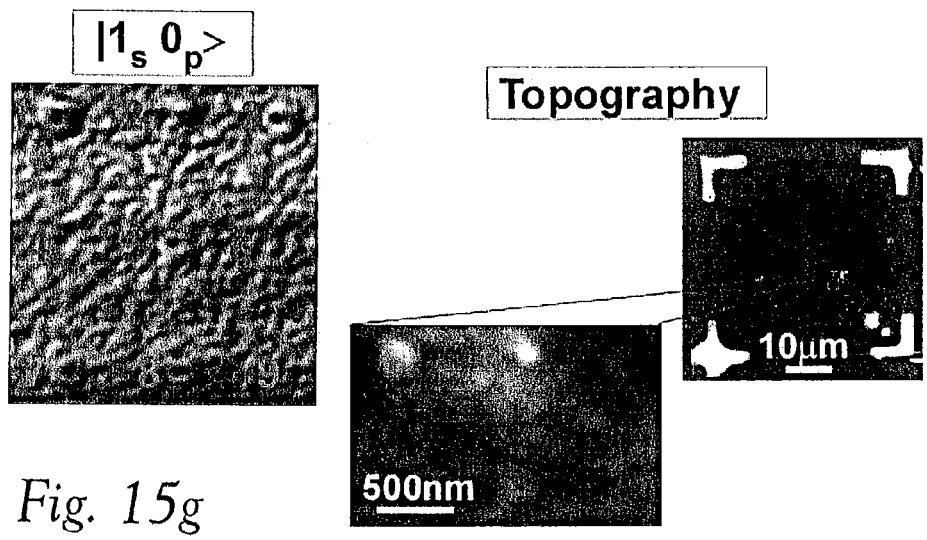
Figure 15H:
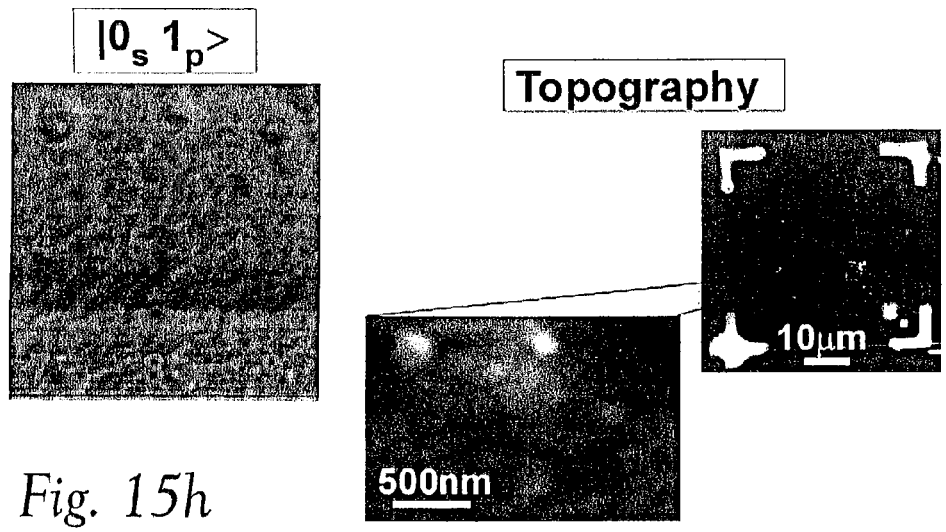
Figure 15I:
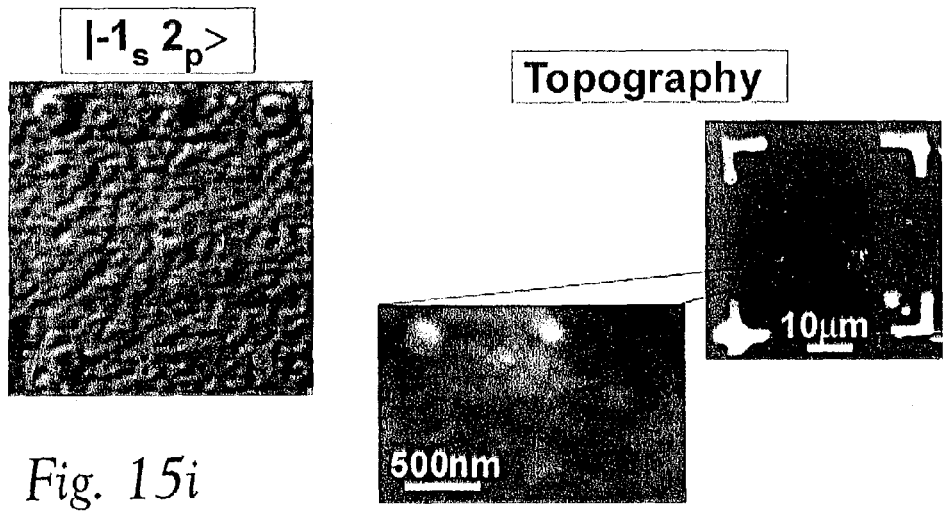
Figure 15J:
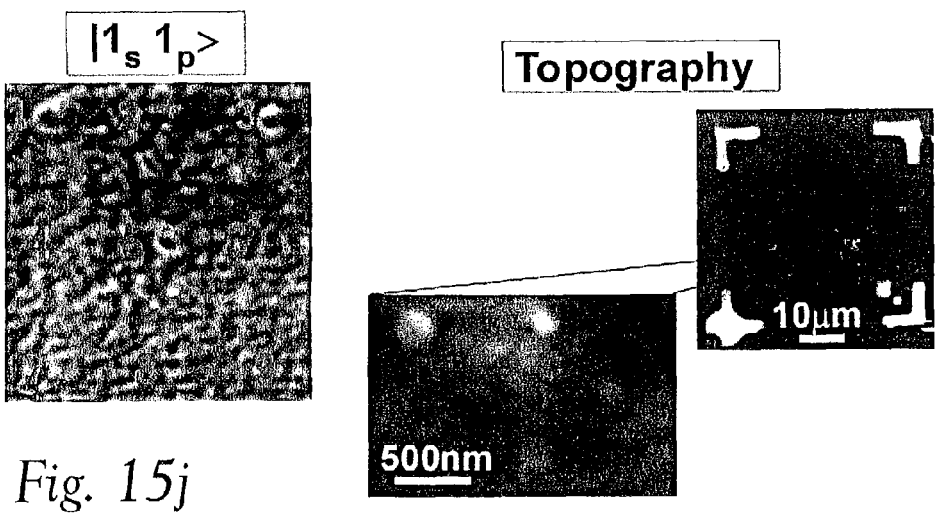
Figure 16B:
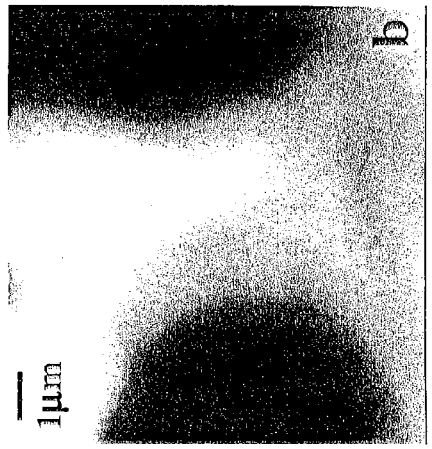
FIGS. 16a-d show topography images of a cross-section of the sample used in FIGS. 6a-j using standard AFM imaging.
Figure 16D:
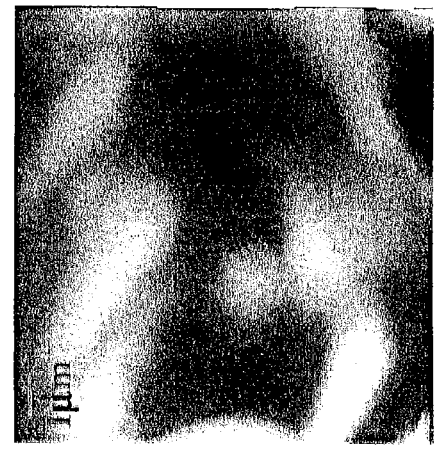
Figure 16A:
Figure 16C:

In the case of imaging a nanofabricated sample, an example of a nanofabricated sample contains subsurface material inhomogeneities in form of a matrix of nickel nanodots confined within a germanium coating on quartz substrate. E-beam lithography can be used to create an embedded material feature that can be used to discern the synthesized modes by providing various surface and subsurface features of the buried structure. In particular, an embedding strategy (involving reactive ion etching (RIE)) that is intended to minimize the surface deformation due to the embedded inhomogeneity can be used. The final metallization stage leaves the sample surface as a uniform featureless structure. As shown in FIGS. 15*a-d*, the embedding strategy can include embedding the inhomogenities in a 3×2 matrix pattern, wherein the three inhomogenities in the top row are identified by numerals 1-3 read from left to right. The bottom row of inhomogenities is similarly identified as 4-6. As shown in FIGS. 15*e-h*, the embedding strategy can include imbedding the inhomogenities in a 3×3 matrix pattern, wherein the three inhomogenities in the top row are identified by numerals 1-3 read from left to right. The middle row and bottom row of inhomogenities are similarly identified as 4-6 and 7-9, respectively. The corresponding images acquired from the modes $|-1_s 1_p\rangle$ (a), $|2_s-1_p\rangle$ (b), $|1_s 0_p\rangle$ (c), and $|0_s 1_p\rangle$ (d) by invoking a first set of frequencies; and $|-1_s 1_p\rangle$ (e), $|2_s-1_p\rangle$ (f), $|1_s 0_p\rangle$ (g), $|0_s 1_p\rangle$ (h), $|-1_s 2_p\rangle$ (i), and $|1_s 1_p\rangle$ (j) using a second set of frequencies, are shown in FIGS. 15*a-h*. As can be observed by direct comparison between the topography image and those acquired from the synthesized modes, the nanostructures (in particular FIGS. 15*d* and *f*) are not apparent at the surface level. Thus, the level of concealment appears satisfactory to probe the differences in the information delivered by the multitude of the synthesized modes. However, improvements in the fabrication can be made as the residues observed for dots 1, 2, 3, and 5 of the matrix are mainly due to non-optimized fabrication parameters (for example if the hole/dot created in the conductive layer by RIE could not be filled at the appropriate level over the matrix. While limited topographic features can be seen in FIG. 15, the overall purpose of demonstrating the usefulness of MSAFM in bringing out the differences between the modes is achieved. All the images presented in FIGS. 15*a-h* result from measurements of the amplitudes of the synthesized modes of frequencies $\omega_{|i_s j_p\rangle}$. In the first set of data shown in FIGS. 15*a-d*, although the amplitudes vary, the six nanostructures are visible in all four images. The images of FIGS. 15*a* and *c* exhibit common features by the virtue of the subsurface information. As shown in FIG. 15*d*, a new perspective is delivered by mode $|0_s 1_p\rangle$ exposing the substrate and the nickel nanostructures. For the particular set of parameters chosen (excitation amplitude and frequencies) and the used probe (k=0.06 N/m), although the amplitude associated with $|2_s-1_p\rangle$ is not superior to those of the lower order couplings, all 6 nanostructures can also be resolved with a strong contrast between the core of the dots and the rest of the sample.

Note that when a given synthesized mode corresponds to one of the many resonances of the system, the corresponding signal will be of higher amplitude (see also FIG. 15). This is in particular important for softer cantilevers. The peripheral features in the region around the dot, in particular around positions 1 and 3, are associated with the nanofabrication process (electron diffusion, etching variation, etc). In the second set of data of FIGS. 15*e-h*) acquired with another set of excitation amplitudes and frequencies, 9 nanostructures can be distinguished, 6 of which (1-6) are similar to the ones presented in the first row of FIGS. 15*a-d*. Note that, similar to FIG. 15*g* and FIG. 15*h*, the contrast is inverted between the image of FIG. 15*e*.

Imaging of Biomass Samples Using MSAFM

The chemically and morphologically complex *Populus* wood and plant cells are currently of prime interest for biomass conversion. However, due to this complexity, nondestructive characterization of such samples is challenging and thus provides a superb opportunity for atomic force microscopy. Indeed, an accurate model of the organization (chemical, structural, etc) of biomass at the cellular level is still missing, slowing progress towards overcoming recalcitrance. FIGS. 6a-j further illustrate the performance of the MSAFM on a cross section of fresh *Populus* wood. From these images, both the complex structure of the sample at a given location, and the variations in morphology for the same cross section are evident. For example, the average size of the cell walls in the region, where the bottom images of FIGS. 6a-j are acquired, appears to be larger than seen in the top images. Topography images corresponding to the MSAFM images of FIGS. 6a-j are presented in FIGS. 16a-d. In FIGS. a-d, the middle lamella (L), the interstitial region between different cell walls (CW); the secondary CW (SCVV), the thickest layer of the plant CWs, are presented in light of the different higher order couplings of MSAFM. Here, the probe was driven at an amplitude of 10Vpp, and the sample at an amplitude of 9Vpp. The spectrum, providing each C-mode invoked, is presented in FIG. 6.

Figure 17:
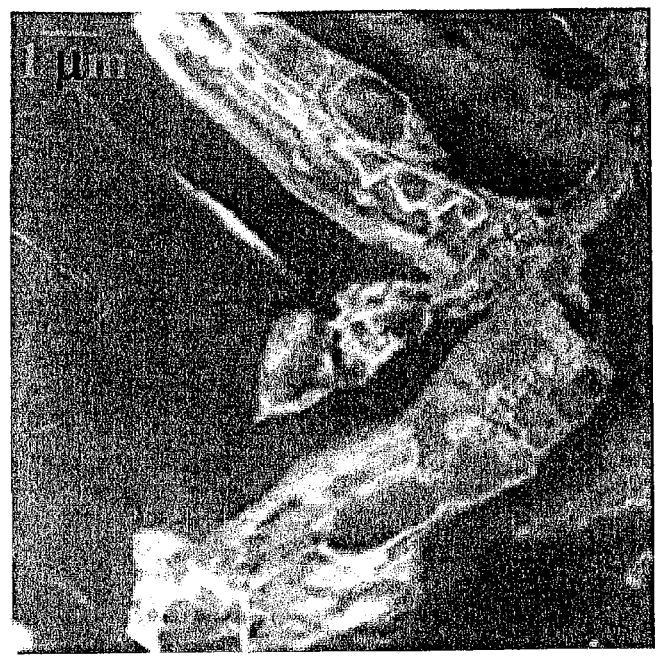
FIG. 17 shows an MSAFM image of a sample using the system of FIG. 3.

Clearly, each of the MSAFM images highlights unique features of the plant cell walls, not retrievable from others by postprocessing. The AFM image (topography as well as a larger scan of the same region) are presented in FIGS. 16a-d for comparison. The observed differences in the textures and contrast in the MSAFM images of FIGS. 6a-j are related to the properties of the sample and can be used to characterize the different layers of the plant cell wall. The observation of an increase in the size of the CW may be described as due to the evolution of the *Populus* system: the primary and secondary CWs are formed at different stages in the evolution of the *populus*. Growing and dividing cells will be composed of primary CW, which is thin and flexible. The stronger and more rigid secondary CW will appear after maturation of the cell. Secondary CWs are abundant in poplar tissues and are rich in cellulose. The lamella is now believed to be rich in lignin and acts as a glue between the different cells of the plant. Such properties are reflected in the MSAFM images as the observed differences in contrast and features MSAFM allows both the amplitude and the phase of S(t) to be used to study the differences in the roughness, elasticity, viscosity, compliance, etc. In FIGS. 6g-j, a larger CW [see FIGS. 16c-d] of the sample is presented by invoking the C-modes: $\omega_{|-p\ 1p>}$=323 kHz (g), $\omega_{|2p-1p>}$=677 kHz (h), $\omega_{|-1p\ 2p>}$=1.646 MHz (i), and $\omega_{|0p\ 2p>}$=2.646 MHz (j), originating from the spectrum in FIG. 6f. Both FIGS. 6a and 6g display a higher sensitivity to the roughness of the sample with FIG. 6g revealing details that are absent in all the images of FIGS. 6h-j. The corresponding image from AFM does not resolve these details (see FIGS. 16a-d for AFM topography and FIG. 17 that is an image of the same area when both the cantilever and the sample are excited). An impressive set of details of the sample can be observed. Cellulose microfibrils are present in FIGS. 6a and 6g in the region closer to the vacuole, indicative of the cellulose content of the SCW. Regions with different orientations of the cellulose microfibrils can be identified from a careful inspection of the images. The different properties of the lamella (L) appear in FIGS. 6a-f, in particular in FIG. 6b. The SCW also appears as an inhomogeneous medium. FIGS. 6c and d highlight other details of the CWs: FIG. 6d is richer in the contrast and exhibits certain grain structure, especially in L, whereas the contrast in FIG. 6c tends to show that the amplitude of the signal is more sensitive to the changes in height (dark regions) than FIGS. 6a, b and d. Indeed FIG. 6c is the only image that does not exhibit a change of color in the CW on the left (close to the green line), which is observable in the others, especially in FIG. 6d. Such parallel study of the various C-mode images helps differentiate the SCW, L, and CC regions. Notably, the difference in contrast and texture in the CC [bottom of FIGS. 6c and d] is interesting, given the high lignin content of this particular region, also observed in their Raman signature. The images obtained without a direct subsurface contribution (probe excitation only), FIGS. 6h-j, tend to respond strongly (high signal is black on the bottom images) to edgy or particular structures for large and rough areas and potentially limiting the contrast for other areas of the sample.

Figure 18A:
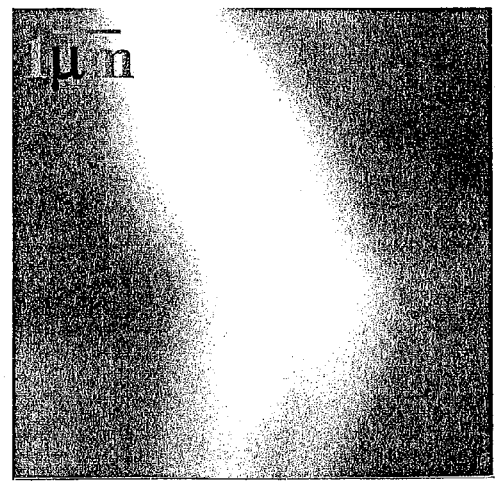
FIG. 18a shows a topography image of a sample using standard AFM imaging.
Figure 18B:
FIG. 18b shows an MSAFM image of the sample of FIG. 18a using the system of FIG. 3.

Comparing FIGS. 6h-j to the image obtained for the same parameters but also with sample excitation (see FIG. 17), it is then possible to identify subsurface features. Note that FIG. 17 displays an image obtained from $|0_s 2_p>$ mode, to be compared to FIGS. 6h-j. Note that this mode is a result of the mixing $<-1_s 1_p|C^1_+|1_s 1_p>$. The excitation of the sample in the case of MSAFM with two initial excitations gives access to additional subsurface details when compared to the image of the same region obtained for the same excitations (FIG. 6i) by driving only the cantilever (with two frequencies). A similar comparison is shown in FIGS. 18a-b, wherein FIG. 18b is an MSAFM image of a poplar cell wall in the configuration of three excitation states that define the $|1_p -1_p\ 1s>$ state and FIG. 18a is a standard AFM topography image (7 μm scan size) of the same region of the poplar cell wall. The system in FIG. 3 is used to generate the results of FIGS. 15, 17 and 18b. Clearly, MSAFM opens a new dimension in the study of nanoscale features of biomass. The images complement each other by highlighting different properties simultaneously.

The foregoing description is provided to illustrate the invention, and is not to be construed as a limitation. Numerous additions, substitutions and other changes can be made to the invention without departing from its scope as set forth in the appended claims. For example, each of the embodiments of FIGS. 1-12 can be conducted in a liquid medium, and in particular, conducted in a fluid cell. Another example would be to replace the PZTs of FIGS. 1-12 by surface acoustic waves (SAW) or quartz crystal microbalance (QCM). In such cases, for the study of the dynamics of the MSAFM, the cantilever probe will engage in interaction with the surface of either the SAW or the QCM device. This interaction is then modulated by the oscillations of the probe and/or SAW and QCM surfaces, giving rise to unique MSAFM C-modes. In applications, a sample under study will be immobilized on the surface of the QCM or SAW while the cantilever probe will come in contact with sample surface and engage in contact-mode interaction. Then oscillations of the cantilever and the SAW or QCM devices will modulate the probe-sample distance to generate operational MSAFM C-modes.

We claim:

1. An analysis system comprising:
   a sample;
   a first excitation source that applies to a sample a first set of energies at a first set of frequencies;
   a second excitation source, independent of said first excitation source, that applies a second set of energies at a second set of frequencies to a probe, wherein said first set of energies and said second set of energies are simultaneously applied to said sample and said probe, respectively, and form a multi-mode coupling effect; and
   a detector that detects dynamics of said probe from which an effect of said multi-mode coupling effect can be obtained.

2. The analysis system of claim 1, wherein said first excitation source is a first vibrational source that applies first vibrational energies to said sample, and wherein said second excitation source is a second vibrational source that applies second vibrational energies to said probe.

3. The analysis system of claim 2, wherein said probe comprises a first electrically conductive component and wherein a second electrically conductive element is attached to said sample, wherein said first electrically conductive component and said second electrically conductive component are in electrical communication with a common power supply so as to create an analysis system where electrostatic forces are predominant.

4. The analysis system of claim 2, further comprising a light source that generates light that is applied to said sample, wherein said applied light affects an amplitude and phase of said multi-mode coupling effect.

5. The analysis system of claim 1, wherein said first excitation source is a first electromagnetic energy source that applies first electromagnetic fields to said sample, and wherein said second excitation source is a second electromagnetic energy source that applies second electromagnetic fields to said probe.

6. The analysis system of claim 5, wherein said probe comprises an electrically conductive component that generates said second electromagnetic fields and an electrically conductive element is attached to said sample, wherein said electrically conductive element generates said first electromagnetic fields.

7. The analysis system of claim 1, wherein said second excitation source is a first vibrational source that applies vibrational energies to said probe, and wherein said first excitation source is an electromagnetic energy source that applies electromagnetic fields to said sample.

8. The analysis system of claim 7, wherein said electromagnetic energy source comprises:
a light source that emits light; and
a tunable modulator that receives said light and modulates said received light.

9. The analysis system of claim 1, wherein said probe is a cantilever.

10. The analysis system of claim 1, further comprising:
a spectrum analyzer that receives a first signal from said detector;
a display that receives a second signal from said spectrum analyzer and generates a spectrum of said sample based on said second signal.

11. The analysis system of claim 1, further comprising:
a lock-in amplifier that receives a first signal from said detector;
a processor that receives a second signal from said lock-in amplifier; and
a display that receives a third signal from said processor and generates an image of said sample based on said third signal.

12. The analysis system of claim 1, wherein said first set of energies are applied to a first surface of said sample and said probe contacts a second surface of said sample positioned opposite to said first surface.

13. A method of analyzing a sample comprising:
applying a first set of energies at a first set of frequencies to a sample;
applying, simultaneously with said applying said first set of energies, a second set of energies at a second set of frequencies to a probe, wherein said first set of energies and said second set of energies form a multi-mode coupling; and
detecting an effect of said multi-mode coupling.

14. The method of claim 13, wherein said first set of energies are first vibrational energies and said second set of energies are second vibrational energies.

15. The method of claim 13, wherein said first set of energies are first electromagnetic energies and said second set of energies are second electromagnetic energies.

16. The method of claim 13, wherein said first set of energies are electromagnetic energies and said second set of energies are vibrational energies.

17. An analysis system comprising:
a first excitation source that applies to a sample a first set of energies at a first set of frequencies;
a second excitation source, independent of said first excitation source, that applies a second set of energies at a second set of frequencies to said sample, wherein said first set of energies and said second set of energies are simultaneously applied to said sample, and form a multi-mode coupling;
a probe that contacts said sample;
a detector that detects dynamics of said probe from which an effect of said multi-mode coupling can be obtained.

18. The analysis system of claim 17, wherein said first excitation source is a first vibrational source that applies first vibrational energies to said sample, and wherein said second excitation source is an electromagnetic energy source that applies second electromagnetic energies to said sample.

19. An analysis system comprising:
a first excitation source that applies to a sample a first set of energies at a first set of frequencies;
a second excitation source, independent of said first excitation source, that applies a second set of energies at a second set of frequencies to said sample, wherein said first set of energies and said second set of energies are simultaneously applied to said sample, and form a multi-mode coupling;
a probe that contacts said sample;
a detector that detects dynamics of said probe from which an effect of said multi-mode coupling can be obtained;
wherein said first excitation source is a first electromagnetic energy source that applies first electromagnetic fields to said sample, and wherein said second excitation source is a second electromagnetic energy source that applies second electromagnetic fields to said sample.

20. The analysis system of claim 17, wherein said probe is a cantilever.

21. The analysis system of claim 17, further comprising:
a spectrum analyzer that receives a first signal from said detector;
a display that receives a second signal from said spectrum analyzer and generates a spectrum of said sample based on said second signal.

22. The analysis system of claim 17, further comprising:
a lock-in amplifier that receives a first signal from said detector;
a processor that receives a second signal from said lock-in amplifier; and
a display that receives a third signal from said processor and generates an image of said sample based on said third signal.

23. The analysis system of claim 17, wherein said probe does not directly receive said first set of energies and does not directly receive said second set of energies.

24. A method of analyzing a sample comprising:
applying a first set of energies at a first set of frequencies to a sample;
applying simultaneously with said applying said first set of energies a second set of energies at a second set of frequencies to said sample, wherein said first set of energies and said second set of energies form a multi-mode coupling; and detecting an effect of said multi-mode coupling effect via a probe that contacts said sample.

25. The method of claim 24, wherein said first set of energies are first vibrational energies and said second set of energies are second electromagnetic energies.

26. A method of analyzing a sample comprising:

applying a first set of energies at a first set of frequencies to a sample;

applying simultaneously with said applying said first set of energies a second set of energies at a second set of frequencies to said sample, wherein said first set of energies and said second set of energies form a multi-mode coupling; and detecting an effect of said multi-mode coupling effect via a probe that contacts said sample;

wherein said first set of energies are first electromagnetic energies and said second set of energies are second electromagnetic energies.

27. The method of claim 24, wherein said probe does not directly receive said first set of energies and does not directly receive said second set of energies.

\* \* \* \* \*